United States Patent
Bacon et al.

(10) Patent No.: US 11,601,288 B1
(45) Date of Patent: Mar. 7, 2023

(54) ON-DEMAND SECURITY CERTIFICATES FOR IMPROVED HOME ROUTER SECURITY

(71) Applicant: Cox Communications, Inc., Atlanta, GA (US)

(72) Inventors: Kinney Chapman Bacon, Lawrenceville, GA (US); David Adam Taylor, Flowery Branch, GA (US)

(73) Assignee: Cox Communications, Inc., Atlanta, GA (US)

( * ) Notice: Subject to any disclaimer, the term of this patent is extended or adjusted under 35 U.S.C. 154(b) by 415 days.

(21) Appl. No.: 16/546,788

(22) Filed: Aug. 21, 2019

(51) Int. Cl.
*H04L 9/32* (2006.01)
*H04L 9/40* (2022.01)
*H04L 9/00* (2022.01)

(52) U.S. Cl.
CPC .......... *H04L 9/3265* (2013.01); *H04L 9/3268* (2013.01); *H04L 63/0823* (2013.01); *H04L 9/50* (2022.05)

(58) Field of Classification Search
CPC . H04L 9/3265; H04L 9/3268; H04L 63/0823; H04L 2209/38; H04L 9/50
USPC ...................................................... 713/157
See application file for complete search history.

(56) References Cited

U.S. PATENT DOCUMENTS

| | | | |
|---|---|---|---|
| 6,247,127 B1 * | 6/2001 | Vandergeest | H04L 63/123 713/100 |
| 7,412,524 B1 * | 8/2008 | Gupta | H04L 9/3265 713/157 |
| 10,461,943 B1 * | 10/2019 | Norum | H04L 63/0823 |
| 10,728,044 B1 * | 7/2020 | Melo | H04L 63/083 |
| 2004/0019808 A1 * | 1/2004 | Devine | H04L 41/0233 726/28 |
| 2004/0177246 A1 * | 9/2004 | Balaz | H04L 63/0272 713/151 |
| 2006/0136748 A1 * | 6/2006 | Bade | H04L 9/3273 713/193 |
| 2007/0180225 A1 * | 8/2007 | Schmidt | H04L 63/0823 713/152 |
| 2007/0250917 A1 * | 10/2007 | Bruchertseifer | H04W 12/02 726/5 |
| 2008/0072311 A1 * | 3/2008 | Mullick | H04L 63/0823 726/15 |
| 2009/0319796 A1 * | 12/2009 | Kim | H04L 9/3263 713/176 |

(Continued)

*Primary Examiner* — Thanh T Le
(74) *Attorney, Agent, or Firm* — Merchant & Gould P.C.

(57) ABSTRACT

A secure connection to a router web UI is provided. In one implementation, responsive to a client request to securely connect to a router web server (RWS), the RWS generates and sends a certificate signing request (CSR) to a remote-security certificate server (R-SCS). Upon validation of the RWS, the R-SCS signs and transmits a router web UI certificate (RWUIC) to the RWS to present to the client. In another implementation, the router includes a local-SCS (L-SCS) that periodically obtains a short-lived intermediate certification authority (ICA) certificate from the R-SCS. Responsive to a client request for secure access to the RWS, the RWS generates and sends a CSR to the L-SCS for the RWUIC. The L-SCS signs the RWUIC and passes the ICA certificate and RWUIC to the RWS, which presents the certificate(s) to the client. Upon validation of the certificate(s), a secure channel between the client and RWS is established.

20 Claims, 11 Drawing Sheets

(56) References Cited

U.S. PATENT DOCUMENTS

| | | | |
|---|---|---|---|
| 2010/0070761 A1* | 3/2010 | Gustave | H04L 9/3297 380/277 |
| 2011/0087882 A1* | 4/2011 | Kuo | H04L 63/0823 713/156 |
| 2011/0116637 A1* | 5/2011 | Schiefelbein | H04L 63/0823 380/286 |
| 2011/0154027 A1* | 6/2011 | Liu | H04L 9/3263 713/158 |
| 2013/0269019 A1* | 10/2013 | Garmark | H04L 63/0823 726/9 |
| 2014/0215206 A1* | 7/2014 | Courtney | H04W 12/043 713/156 |
| 2014/0281503 A1* | 9/2014 | Mills | H04L 9/3268 713/157 |
| 2014/0289511 A1* | 9/2014 | Tuch | H04L 63/0272 713/156 |
| 2015/0038129 A1* | 2/2015 | Sundareswaran | H04L 63/102 455/418 |
| 2015/0188779 A1* | 7/2015 | McCanne | H04L 63/10 709/223 |
| 2015/0256345 A1* | 9/2015 | Vaid | H04L 9/3268 713/158 |
| 2016/0173286 A1* | 6/2016 | Gallagher | H04L 9/321 713/156 |
| 2017/0012967 A1* | 1/2017 | Holloway | H04L 63/0823 |
| 2018/0006827 A1* | 1/2018 | Naik | G06F 1/32 |
| 2018/0007033 A1* | 1/2018 | Ajitomi | H04L 63/061 |
| 2018/0018663 A1* | 1/2018 | Van | G07F 7/0873 |
| 2018/0069708 A1* | 3/2018 | Thakore | H04L 9/006 |
| 2018/0198762 A1* | 7/2018 | Cline | H04L 63/0428 |
| 2018/0316510 A1* | 11/2018 | Rai | H04L 9/3268 |
| 2019/0097976 A1* | 3/2019 | Elsins | H04L 12/4641 |
| 2019/0268767 A1* | 8/2019 | Wu | H04L 63/162 |
| 2019/0384586 A1* | 12/2019 | Jiang | H04L 9/006 |
| 2020/0015087 A1* | 1/2020 | Pak | H04W 12/03 |
| 2020/0044869 A1* | 2/2020 | Lutz | H04L 9/3265 |
| 2020/0154272 A1* | 5/2020 | Uy | H04L 63/101 |
| 2020/0228972 A1* | 7/2020 | Choi | H04L 63/0823 |
| 2020/0336316 A1* | 10/2020 | Jain | G06F 9/45558 |

* cited by examiner

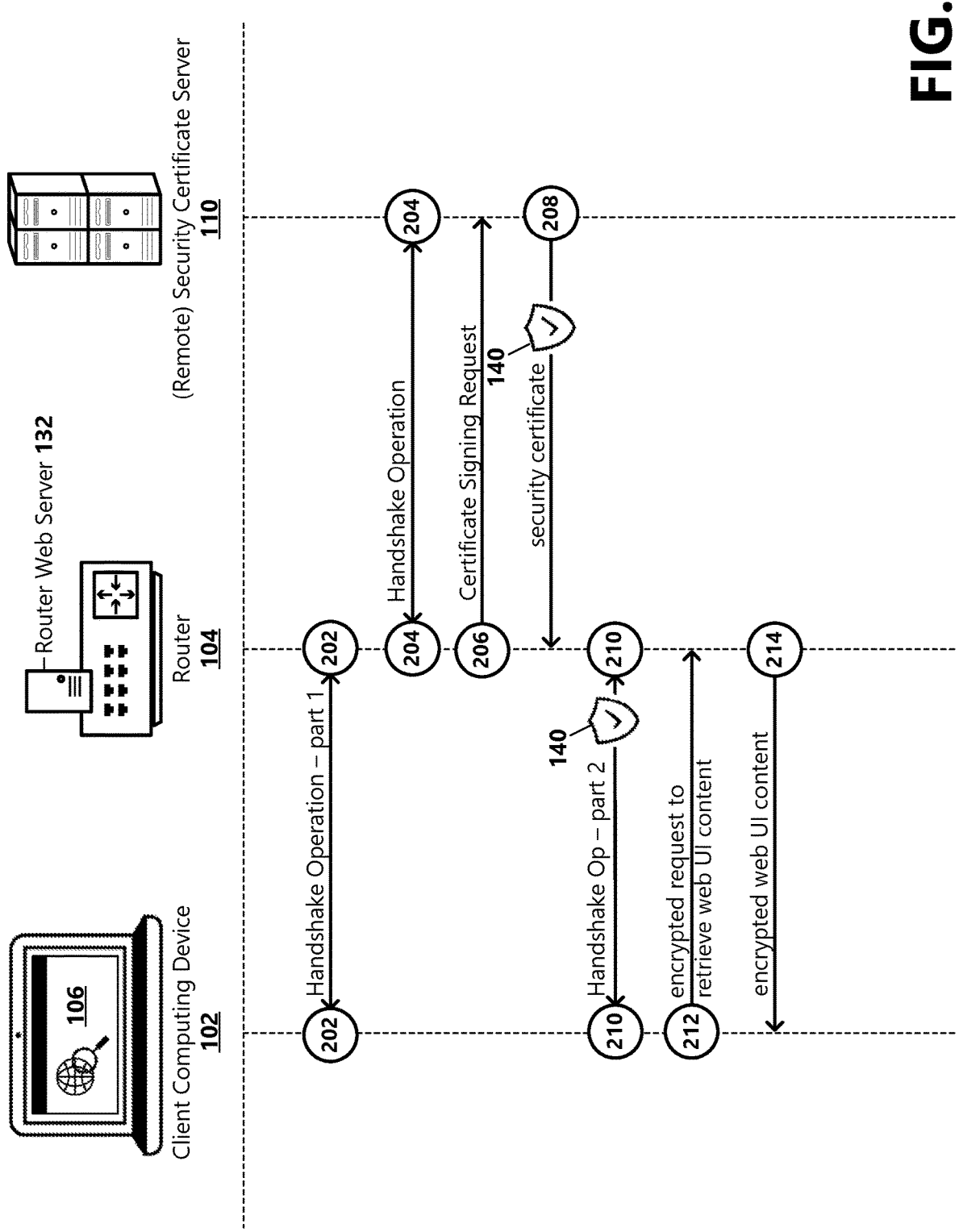

ON-DEMAND SECURITY CERTIFICATES FOR IMPROVED HOME ROUTER SECURITY

BACKGROUND

Home routers function to provide a wireless or wired network connection to devices in a user's home. For example, a home router allows computers (e.g., mobile devices, laptop computers, desktop computers, tablets, gaming consoles) and other network devices (e.g., Internet-enabled televisions, smart thermostats, security systems) to access networks, such as the Internet. A router web interface is a common way to manage a home router. For example, most home routers comprise a web interface that can be accessed by a web browser on a local networked device. A user may wish to access his/her router's web interface to manage his/her home network, for example, to configure Wi-Fi security settings, implement or adjust parental controls, view a status of devices connected to the router, etc. Typically, users are enabled to access the router web user interface by opening a web browser (e.g., CHROME by GOOGLE, FIREFOX by MOZILLA CORPORATION, SAFARI by APPLE, or MICROSOFT EDGE by MICROSOFT CORPORATION) and pointing it to the router's gateway URL or IP address.

Current home routers typically either do not include a security certificate; or, a plurality of security certificates may be embedded within the routers. When a home router web user interface is configured with a default certificate, it may be self-signed (i.e., not signed by a recognized certification authority (CA)), and thus may not be trusted by most web browsers. Self-signed certificates that come pre-installed on some routers may be publicly untrusted, easy to duplicate, and vulnerable to Man-In-The-Middle (MITM) attacks. For example, trusted CAs will not issue a certificate to a private IP address (such as a home router IP address) because the CA cannot verify its identity. Accordingly, many common web browsers may not trust the router web user interface and may block access or not allow immediate access to it. For example, if a user tries to access the router's web user interface in a web browser, the web browser may give a warning message that the web connection is not secure or private. To access the router web user interface, the user may have to click on one or more buttons to allow an exception to access to the web page, change security settings of the web browser, etc.

Sometimes, a web browser may be configured to allow access to web pages that do not utilize HTTPS (Hypertext Transfer Protocol Secure), an extension of the Hypertext Transfer Protocol (HTTP) that uses Transport Layer Security (TLS) for protecting data sent via HTTP between clients and servers. However, oftentimes, the router's self-signed certificate is expired due to the length of time between the date of manufacture of the router and the date of installation in the user's home. Accordingly, the web browser may give a warning message and block access or not allow immediate access to the router web UI. The user may have to click on one or more buttons to allow an exception to access to the web page, change security settings of the web browser, etc.

As can be appreciated, enabling access to an unsecured website not only poses a security risk, but can also be confusing to users. For example, users' home routers are increasingly being targeted by attackers, and fake security certificates are increasingly being created by cybercriminals with fraudulent intentions. While a self-signed certificate may help keep the user's data safe from eavesdroppers, the user (who may have little to no technical knowledge) may be unaware of who the recipient of the data is or how to view the certificate to determine the recipient. If an attacker is on the same network as the user, the attacker may be able to carry out a MITM attack to intercept the user's communications.

As cyberattacks are on the rise, users are increasingly being warned to only visit web pages that have a certificate that is signed by a trusted CA. For example, when a user visits a bogus website using a common web browser and the website has a self-signed fake certificate, a similar type of a warning message as described above may be displayed in the web browser. Users are oftentimes warned to heed the warning and avoid these sites. An expectation for users to disregard a security warning notification and enable access to the router web user interface is inconsistent with the messaging to avoid non-trusted sites. If the user is instructed that overriding network security warnings is acceptable and that it is safe to ignore a security warning, dangerous browsing behavior may be encouraged. For example, the user may lower his/her guard toward these warnings, which can increase the risk of the user ignoring warning on public sites that can leave the user, the user's local network, and the user's computing devices vulnerable to malware and other threats.

Additionally, when a home router comprises an embedded security certificate, there may be an expiration date within the certificate that invalidates the certificate after a certain date. From a security perspective, it may be desirable that a certificate have a limited lifetime (e.g., 1-3 years); however, this makes storing the certificate impractical for products with a multi-year life. For example, typical home routers have a lifetime of greater than five years. If a certificate expires, it can be difficult to update the certificate if it is unique to each router. If a global certificate is utilized, a firmware upgrade may be required. This can be increasingly difficult if the home router vendor has gone out of business or no longer supports the product.

Additionally, the amount of secure memory available on a router is limited. For example, the memory may be resident on a SoC (System on Chip); and since area is equal to money, chip vendors typically try to minimize the amount of memory available. Moreover, extra methods are often utilized to add security countermeasures, which utilizes extra area. Accordingly, storing a single certificate which can read by a wide variety of computers may utilize an increased amount of limited secure memory resources. While there are external secure memory devices available, there are additional costs associated; thus, router manufacturers try to avoid using them and typically only use onboard SoC secure memory.

SUMMARY

Aspects of a router device, a security certificate server, and a method for providing secure access to a router web user interface are provided. In example aspects, a router web server of a router device is configured to request a signed router web UI security certificate from a security certification server (SCS) on demand responsive to a client connection to the router web server.

According to a first implementation example, the system includes a remote SCS that is configured as a certificate authority (CA) that receives a certificate signing request (CSR) from the router web server, authenticates the router web server, signs a router web UI security certificate for the router web UI, and then passes the signed web UI security certificate to the router web server. The router may pass the signed router web UI security certificate to the client to establish a secure channel for enabling the client to access the router web UI via the secure channel. According to an example aspect, the client is configured to trust the remote SCS as a CA based at least in part on a CA certificate installed on the client corresponding to the remote SCS. In an example aspect, the router web UI security certificate is specific to the client attempting to establish the secure connection with the router for accessing the router web UI. In another example, the router web UI security certificate is a single-use certificate. In another example aspect, the router web UI security certificate is short-lived for increasing security. For example, a short-lived certificate may be used to prevent theft or reuse of a certificate. In some examples, reuse of a certificate may enable delivery of malware or a collection of credentials. Accordingly, the router web UI security certificate may help to prevent malware attacks.

According to a second implementation example, the router device includes a locally-provided service that is configured as the signer/issuer of the router web UI security certificate. In this implementation example, the local SCS service requests and obtains an intermediate CA certificate issued by the remote SCS that enables the local SCS service to act as an intermediate CA and issue end-entity server certificates, such as the router web UI security certificate. According to an aspect, the intermediate CA certificate may be a short-lived certificate for increased security. As in the first implementation example, the client is configured to trust the remote SCS as a CA. When a client attempts to connect to the router web server, the router web server may direct a CSR to the local-to-the-router SCS service, which issues the router web UI security certificate to the router web server. The router web server is then enabled to present the router web UI security certificate to the client for establishing a secure channel between the client and the router web server. Accordingly, a trust-chain is generated that begins at the trusted root CA (i.e., the remote SCS), through the intermediate CA (i.e., the local SCS service), and ends with the router web UI security certificate issued to the router web server.

As can be appreciated, implementation of aspects of the present disclosure provide an improvement to the security of the connection between the client and the router, as the client is enabled to verify the identity of the router based on a security certificate signed by a trusted CA. Additionally, the user is not presented with a security warning notification as described in the Background section, which can improve efficiency (e.g., reduces or eliminates user interactions) and the user experience. For example, the user does not have to dismiss the warning or allow an exception to the client's security settings for allowing a connection to the router. Further, by moving the functionality of managing security certificates from the router to the cloud, router memory can be conserved and the processing load on the router can be reduced.

Moreover, the second implementation example (local SCS acting as an intermediary CA) provides further benefits of reduced network bandwidth, increased security, improved performance, and improved offline operation. For example, an added level of security may be provided due in part to web UI security certificates being signed by an intermediate certificate not having to be issued directly from a root certificate. For example, the root key can be kept offline and used as infrequently as possible, which reduces the likelihood of compromising the root key. If the intermediate key is compromised, the root CA (remote SCS) can revoke the intermediate certificate and create a new intermediate cryptographic pair. Additionally, by using a local intermediate CA architecture, the local SCS is configured to locally handle real-time (or near real-time) signing of the router web UI security certificate, which is time and latency sensitive. According to an aspect, signing of the intermediate CA certificate can be performed on a scheduled basis, rather than immediately. For example, batches of router devices may be configured to send scheduled requests for signing intermediate CA certificates, which can allow for the load on the remote SCS to be better managed (e.g., on-demand request with immediate turnarounds), and for network bandwidth and end-user latency to be reduced. Further, web UI security certificates can be issued to clients in an offline mode.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIG. 2A is a sequence diagram showing an example sequence of messages exchanged between a client computing device, a router, and a remote security certificate server for providing secure access to a router web user interface according to an embodiment;

DETAILED DESCRIPTION

Figure 1A:
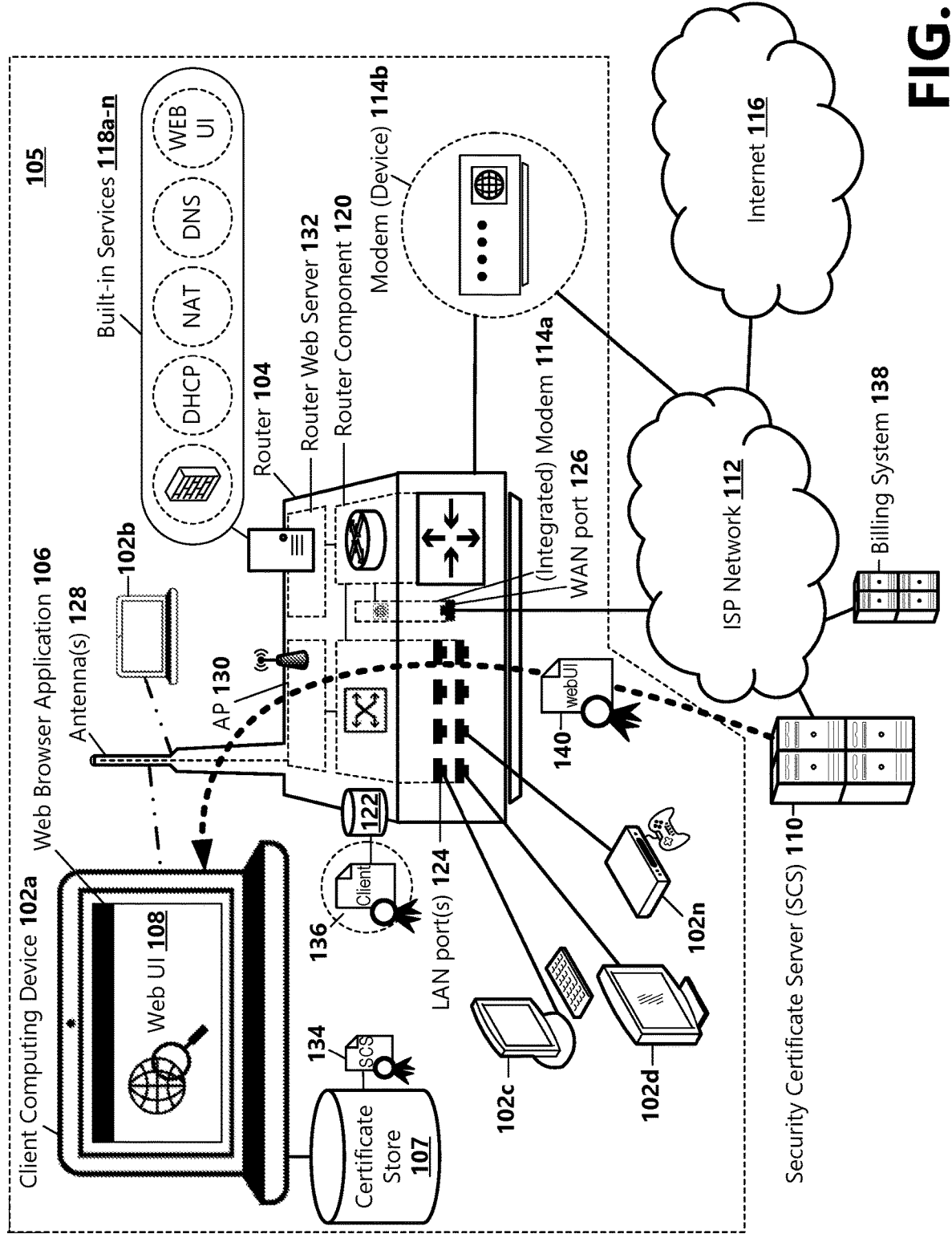
FIG. 1A is a block diagram of an example operating environment in which a system can be implemented for providing secure access to a router web user interface according to an embodiment.

Aspects of the present disclosure provide secure access to a router web user interface. FIG. 1A is a block diagram of a first example operating environment 100 in which a system for providing secure access to a router web user interface (UI) 108 can be implemented according to an embodiment. According to an aspect, as part of providing secure access to the router web UI 108, a security certificate 140 for the router web UI is requested and signed on demand. For example, security certificates are used in various protocols, such as the Internet Key Exchange (IKEv2) and the Transport Layer Security (TLS) protocol, where certificates are used to authenticate communicating parties to each other. Security certificates are issued by Certificate Authorities (CAs) to End Entities (EE) to be used to authenticate them to Relying Parties (RPs) in security protocols. The first example operating environment 100 illustrated in FIG. 1A includes a remotely-located security certificate server (remote SCS 110) configured as a CA, at least one client computing device 102a-n (generally 102) comprising a user agent, such as a web browser application (herein referred to as a web browser 106), operating as an EE, and a home router device (router 104) including a router web server 132 configured as an RP. As will be described below with reference to FIG. 1B, a second example operating environment further includes a local SCS 150.

According to an aspect, the remote SCS 110 is illustrative of a software application, module, or computing device operative or configured to perform CA functionalities corresponding to issuing signed certificates. In an example aspect, the remote SCS 110 is configured to issue a signed web user interface (UI) security certificate 140 for enabling the web browser 106 operating on the client computing device 102a to securely connect with the router web server 132 of the router 104 for accessing a router web UI 108 provided by the router web server 132. For example, a user of the client computing device 102a may want to access the router's web UI 108 to configure Wi-Fi security settings, implement or adjust parental controls, view a status of devices connected to the router 104, etc.

According to an aspect, the remote SCS 110 may operate on a network of the provider of network connectivity to the user's premises (i.e., ISP (Internet Service Provider) network 112). For example, functionality of the remote SCS 110 may be provided as a service by the user's ISP. In other examples, the remote SCS 110 may operate on a remote resource and may be provided to the ISP as a service. The remote SCS 110 may be implemented on a single server computing device or may be distributed across a plurality of server computing devices that together perform the overall functionality of the SCS. As part of performing CA functionalities corresponding to issuing signed certificates, the remote SCS 110 may be configured to receive certificate requests, validate requestors, sign certificates, and provide signed certificates to requestors, and the like.

In an example aspect, the remote SCS 110 is configured to issue a signed router web UI security certificate 140 on demand. For example, responsive to receiving a request for a secure channel to the router web server 132, the router web server may be configured to automatically generate a certificate signing request (CSR) for a router web UI security certificate 140. As part of generating the CSR, the router web server 132 may create a public and private key pair, and forward the CSR including the public key to the remote SCS 110 for signing. In some examples, the router web server 132 may include optional fields and extensions to the CSR so that the router web UI security certificate 140 is specific to the client (web browser 106 operating on a client computing device 102). In some implementations, the router web server 132 may be configured to request a router web UI security certificate 140 from the remote SCS 110 periodically. This example aspect can be utilized for off-network operation, where the router web server 132 obtains and stores a short-lived router web UI security certificate 140 that can be used for secure access with a client even when there may not be a current connection between the router web server and the remote SCS 110. In response to the request for the web UI security certificate 140, the remote SCS 110 may be configured to authenticate the router web server 132, sign the CSR for the router web UI security certificate 140 for the router web UI 108, and pass the signed web UI security certificate to the router 104. The router web server 132 may then pass the router web UI security certificate 140 to the client computing device 102a to establish the secure channel.

Based on the CSR, the web UI security certificate 140 may comprise a set of fields that include data, such as a subject (i.e., the entity to which the certificate is issued), validity dates (i.e., when the certificate is valid), issuer (the entity that issued the certificate), the router web server's public key, and a signature. According to an aspect, the signature is a hash that is encrypted with a private key created by the remote SCS 110 using the key usage details included in the CSR. As will be described in further detail below, the web browser 106 is configured to recognize the remote SCS 110 as a trusted CA and comprises or has access to the public key of the remote SCS 110 (e.g., that corresponds to the SCS's private key). The web browser 106 may use the remote SCS's public key to verify that the router web UI security certificate 140 is indeed signed by the remote SCS 110. In various implementations, the web browser 106 may verify or confirm that the router web UI 108 domain name or the IP address of the router web server 132 matches the router web UI 108 domain name or the IP address of the router web server 132 included in the router web UI security certificate 140.

When the router web UI 108 address is confirmed or upon verification of the web UI security certificate 140, the web browser 106 may generate a shared symmetric key which can be used to encrypt data traffic on the connection between the computing device 102a and the router web server 132. As is known in the art, symmetric encryption is a form of computerized cryptography using a singular encryption key to guise an electronic message; data conversion of the message includes using a mathematical algorithm along with a secret key (i.e., the shared symmetric key), which results in the inability to decipher the message. According to an aspect, the web browser 106 may encrypt the symmetric key with the public key of the router web server 132 and then send the encrypted symmetric key to the router web server 132. Accordingly, this may ensure that only the router web server 132 can decipher the communication since only the router web server 132 has its private key. According to an aspect, messages between the web browser 106 and the router web server 132 can be encrypted with the shared symmetric key. Thus, eavesdroppers may be prevented from passively listening in on the encrypted traffic since they do not have access to the shared symmetric key.

In an example aspect, the router web UI security certificate 140 is a short-lived security certificate. For example, the validity period of the router web UI security certificate 140 may be set with a short (e.g., one hour, several hours, one day) validity period. As can be appreciated, a short-lived web UI security certificate 140 can help to increase security. For example, if the symmetric key or the private key is compromised, the potential for abuse is lower (than certificates with longer validation periods) because the certificate 140 and its private key expire within a short period of time.

A customer premises network 105, as illustrated in FIG. 1A, includes one or a plurality of devices 102 communicatively coupled to a home router 104. In example aspects, the customer premises network 105 comprises a private network between these devices 102, such as a local area network (LAN) or personal area network (PAN). Communications between the devices 102 of the customer premises network 105 may be wired, wireless, or both. The home router 104 may comprise one or more LAN ports 124 through which one or more devices 102 can connect. For example, a desktop computer 102c may connect to the home router 104 via an Ethernet cable. The home router 104 may further comprise an access point 130 for creating a wireless LAN, and may include one or more (external or embedded) antennas 128 for transmitting and receiving radio frequency (RF) signals. For example, a laptop computer 102a, a mobile communication device, or a video streaming device may be connected to the home router 104 via a Wi-Fi connection or other wireless connection. The devices 102 in the customer premises network 105 may include, for example, set-top boxes (STBs), televisions 102d, laptop computers 102a,b, desktop computers 102c, mobile phone devices, gaming devices 102n, Internet of Things (IoT) devices, smart televisions, dedicated digital media players, speaker devices, wearable devices, home security and monitoring devices, smart appliances, Cyber-Physical Systems (CPS) devices, or other types of computation and communication devices.

According to an aspect and as will be described in further detail below, at least one of the user's client computing devices 102a includes a user agent, such as a web browser application (herein referred to as a web browser 106) for accessing sites or information on a network (e.g., ISP network 112, the Internet 116, other networks). For example, the web browser 106 is configured to retrieve or fetch code, typically written in HTML (HyperText Markup Language) and other computer languages, from a web server. The web browser 106 is further configured to interpret the code that it retrieves and display it as a web page on a display integrated with or coupled to the user's client computing device 102 for the user to view. In various examples, user interaction may be needed to instruct the web browser 106 to which website or specific web page to navigate. Entering a web address or URL (Uniform Resource Locator) of the web page into an address bar is one example of a way to instruct the web browser 106 where to obtain a page or pages from for display to the user.

According to aspects of the disclosure, the web browser 106 is configured to access a web UI 108 from the router web server 132 embedded in the user's home router 104; and, according to an example, one way to navigate to the router web UI 108 is to enter the IP (Internet Protocol) address (sometimes referred to as the default gateway number) of the router 104 in the address bar of the web browser 106. As can be appreciated, this is one example; other means of navigating to the router web UI 108 are possible and are within the scope of the present disclosure. As described above, the user may choose to navigate to the router web UI 108 to configure the home router 104, to change router settings, to configure Wi-Fi security settings, implement or adjust parental controls, view a status of devices connected to the router, etc.

In example aspects, for increased security, many common web browsers 106 may not immediately allow a connection to web pages that do not use Hypertext Transfer Protocol Secure (HTTPS). As is known in the art, HTTPS is an extension of the Hypertext Transfer Protocol (HTTP) that uses Transport Layer Security (TLS) for protecting data sent via HTTP between clients and servers. For example, TLS is a cryptographic protocol that utilizes a digital certificate's key pair (e.g., to perform encryption and validation) to provide end-to-end security of data sent between clients and servers over the Internet 116. Recent versions of major web browsers 106 currently support TLS, and it is increasingly common for web servers to support TLS by default. For example, HTTPS provides authentication of an accessed website and protection of the privacy and integrity of the exchanged data while in transit; thus, HTTPS may provide reasonable assurance that one is communicating without interference by attackers with the website that one intends to communicate with, as opposed to an impostor website. Accordingly, when attempting to connect to a web page that does not use HTTPS, the web browser 106 may warn the user that the web connection is not secure or private, and the user may have to click on one or more buttons to allow an exception to access to the web page.

As mentioned above, the TLS protocol utilizes a digital certificate's key pair. A TLS key pair is comprised of a private key and a public key. These two keys are related to one another by means of a cryptographic algorithm. The private key is "private" to a server which receives the incoming TLS connection and is kept secret. According to an aspect, the server (e.g., router web server 132) may introduce itself to the client (e.g., web browser 106) by obtaining a signed router web UI security certificate 140 from the remote SCS 110 and presenting the certificate to the client.

According to an example aspect, the web browser 106 includes at least one certificate store 107 configured to store security certificates. According to another example aspect, the operating system (OS) of the client computing device 102a includes at least one certificate store 107 that the web browser 106 is enabled to access. The at least one certificate store 107 can be utilized to store security certificates that authenticate an associated server to clients. According to an aspect, the at least one certificate store 107 may include a trusted root CA store, which stores trusted CA certificates. In example aspects, the client computing device 102a may be configured to implicitly trust certificates stored in the trusted root CA store. When a security certificate is signed by a trusted CA, the authenticity of the public key that is included in the certificate may be ensured. For example, the web browser 106 can rely on the public key to establish secure communications with a server, or validate documents digitally signed by a corresponding private key. When a security certificate is self-signed or expired (which is common with many security certificates presented by many current home routers 104), the web browser 106 may be configured to display a security alert that advises the user of a security risk and that may require a user response to either close the associated webpage or to continue to the website, which may include an additional warning that continuing to the website is not recommended.

According to an aspect, the home router 104 may comprise a processor, a memory, persistent storage, and a communication interface, which may be interconnected by one or more buses or transmission media. The persistent storage may comprise code, such as firmware, which, when loaded into the memory and executed by the processor, may enable the router 104 to perform various functions. For example, a routing engine 120 of the home router 104 may execute instructions to control router activities (e.g., routing incoming and outgoing network traffic within the customer premises network 105 and across other networks) and to build a data forwarding table. According to an aspect, the persistent storage may comprise a secure storage 122 configured to store one or more security certificates. These certificates may provide a basis for various security services, such as data confidentiality, content integrity, and device authentication.

According to an aspect, the home router 104 comprises a router web server 132, which is configured to host various built-in services 118a-n (generally 118), such as a firewall service, a DHCP (Dynamic Host Configuration Protocol) service, an NAT (Network Address Translation) service, a DNS (Domain Name Space) service, a web UI service, etc. For example, the web UI service 118 may generally represent any combination of hardware and programming capable of serving web pages to client computing devices 102. Such web pages may include the web UI 108, that when displayed, allows a user to configure the home router 104, to change router settings, to configure Wi-Fi security settings, implement or adjust parental controls, view a status of devices connected to the router, etc.

For enabling the devices 102 on the customer premises network 105 to access the Internet 116 or other networks, the home router 104 may include a modem 114a or be connected to a modem (device) 114b. In some examples, a home router 104 that includes a modem 114a may sometimes be referred to as a gateway device. The modem 114 may be connected to the ISP network 112, which typically provides cable or DSL Internet service. For example, a cable modem 114 may have a coaxial connection (WAN port 126) that connects to a cable port in the user's home; or a DSL modem 114 may have a telephone connector/RJ-11 jack, which connects to a telephone socket in the user's home. Connection of or integration of a modem 114 to the home router 104 (e.g., instead of directly to a computing device 102) enables devices 102 connected to the home router to be connected to the modem, and therefore, the ISP network 112, the Internet 116, and other networks. Such networks can include the Internet, an intranet, an extranet, local-area networks, wide-area networks, fiber-coax networks, public switched telephone networks, global telephone networks, wired networks, wireless networks, and combinations thereof. Details of computing devices and variations thereof can be found in FIGS. 5, 6A, and 6B.

According to an aspect and as described above, the router web server 132 of the home router 104 is configured to generate and transmit a certificate signing request (CSR) to the remote SCS 110 for requesting the remote SCS 110 to issue and sign a web UI security certificate 140 on demand. For example, the home router 104 is configured to request the signed web UI security certificate 140 to pass to the client computing device 102a for enabling the web browser 106 executing on the client computing device 102a to securely access the home router's web UI 108. According to an aspect, when a user of the client computing device 102a attempts to access the router web UI 108 of the home router 104, the web browser 106 may be configured to establish a secure connection (e.g., TLS connection) with the router web server 132. As part of establishing a secure connection to the router web UI 108, the web browser 106 and the router web server 132 may perform a TLS handshake protocol, wherein the web browser 106 and the router web server 132 exchange information used to determine connection properties.

In example aspects, responsive to receiving a request to access the router web UI 108 (e.g., receive a user input of the address of the router web server 132 that provides the router web UI 108), the web browser 106 may transmit a "Client Hello" message to the router web server 132. The "Client Hello" message may include the following information: supported client versions, a client random, a session ID, and supported cipher suites. For example, the "Client Hello" message may include a list of TLS/SSL protocol versions that it supports, wherein a preferred version (e.g., latest available version) may be listed first. The client random may be a 32-byte random number. The client random and the server random may be used later to generate a symmetric key for encryption. The cipher suites may include combinations of cryptographic algorithms. For example, each cipher suite may comprise a cryptographic algorithm for each of the following tasks: key exchange, authentication, bulk (data) encryption, and message authentication. The web browser 106 may send the router web server 132 a list of the cipher suites that it supports in order of preference. In some examples, the web browser 106 may request additional functionality for the connection. For example, the "Client Hello" message may further include an extension that allows the web browser 106 to signal supported and preferred signature algorithms and hash functions.

According to an aspect, periodically or responsive to receiving the "Client Hello" message, the router web server 132 may be configured to generate and send a CSR to the remote SCS 110 for the signed router web UI security certificate 140, which it can use to share its public key with the web browser 106. In an example aspect, the remote SCS 110 is a trusted CA to the client computing device 102a. For example, the remote SCS 110 may be recognized as a legitimate and trusted CA to the client computing device 102a or web browser 106 based on a CA certificate for the remote SCS 110 (herein referred to as a remote SCS CA certificate 134) that is stored in the certificate store 107 (e.g., trusted root CA store). In one example aspect, the remote SCS CA certificate 134 is added to the trusted root CA store of the certificate store 107 as part of an on-boarding process when the home router 104 is installed in the user's home. In another example aspect, an application can be provided (e.g., as part of the on-boarding process) and installed on the user's computing device 102 that installs the remote SCS CA certificate 134 in the trusted root CA store. Other methods of adding the remote SCS CA certificate 134 to the trusted root CA store are possible and are within the scope of the present disclosure. According to an aspect, the remote SCS CA certificate 134 comprises the remote SCS's public key, which the web browser 106 is enabled to use for verifying the router web UI security certificate 140 (e.g., signed by the remote SCS's private key). The computing device 102 and the web browser 106 may trust the remote SCS CA certificate and certificates in the certificate store 107 until they expire or are revoked.

As mentioned above, the router web server 132 of the router 104 is configured to generate and send a certificate signing request (CSR) to the remote SCS 110 for issuing a signed web UI security certificate 140. In some example aspects, this can occur periodically. For example, for enabling an off-line experience, where a user is enabled to access the router web UI 108 without connection to an external network (e.g., external to the customer premises network 105), the router web server 132 may periodically (e.g., when a previously-obtained certificate has expired) obtain and store a signed router web UI security certificate 140 that can be used when the router 104 may be offline. In other example aspects, the router web server 132 generates and sends a CSR to the remote SCS 110 responsive to receiving a request for a secure connection with the router web server 132 (e.g., for accessing the web UI 108). For example, when the user uses the web browser 106 to access the web UI 108, the router web server 132 of the home router 104 may send the CSR to the remote SCS 110 for requesting a signed web UI security certificate 140 on demand. That is, rather than storing a web UI security certificate 140 for an extended time, the home router 104 may be configured to obtain a signed single-use or short-lived certificate at the point when it is needed to establish a secure connection with a requesting client (e.g., web browser 106). As part of requesting the signed web UI security certificate 140, the router 104 may be configured to establish a secure connection with the remote SCS 110. For example, the router web server 132 and the remote SCS 110 may perform a TLS handshake protocol, wherein the router web server 132 and the remote SCS 110 exchange information used to determine connection properties.

The TLS handshake protocol may include the following steps. First, the router web server 132 may send a "Client Hello" message to the remote SCS 110. The "Client Hello" message may include the following information: supported client versions, a client random, a session ID, and supported cipher suites. For example, the "Client Hello" message may include a list of TLS/SSL protocol versions that it supports, wherein a preferred version (e.g., latest available version) may be listed first. The client random may be a 32-byte random number. The client random and the server random may be used later to generate a key for encryption. The session ID may be used for the connection. For example, if the session ID is not empty, the remote SCS 110 may search for previously cached sessions and resume that session if a match is found. The cipher suites may be combinations of cryptographic algorithms. Typically, each cipher suite may comprise a cryptographic algorithm for each of the following tasks: key exchange, authentication, bulk (data) encryption, and message authentication. The router web server 132 may send the remote SCS 110 a list of the cipher suites that it supports in order of preference. In some examples, the router web server 132 may request additional functionality for the connection. For example, the "Client Hello" message may further include an extension that allows the router web server 132 to signal supported and preferred signature algorithms and hash functions.

Responsive to receiving the "Client Hello" message, the remote SCS 110 may reply with a "Server Hello" message. The "Server Hello" message may either include selected options (from among those proposed in the "Client Hello" message), or it may be a handshake failure message. For example, the remote SCS 110 may select a preferred version of the SSL/TLS protocol from among those presented by the router web server 132 and include the selected preferred version in the "Server Hello" message. The "Server Hello" message may further include the server random, which may be a 32-byte random number. The server random and the client random may be used later to generate the encryption key. In an example aspect, if the "Client Hello" message includes a session ID value, the remote SCS 110 may be configured to search for previously cached sessions. If a match is found, that session ID may be used to resume the session. If the client session ID is empty, a new session may be created by the remote SCS 110 and sent as the server session ID in the "Server Hello" message. The "Server Hello" message may further include a selected cipher suite selected from among the cipher suites sent in the "Client Hello" message. As part of the handshake protocol, the remote SCS 110 may further send a signed TLS/SSL certificate that proves its identity to the router web server 132. For example, the remote SCS's signed certificate may include the public key of the remote SCS 110.

According to an example aspect, the remote SCS 110 may be configured to authenticate the router web server 132 based on credentials that verify that the router web server 132 is who it claims to be for establishing a secure (e.g., TLS) connection between the home router and the remote SCS. In some implementations, the remote SCS 110 may be configured to request a client certificate from the router web server 132 for authentication. Responsive to the request, the router web server 132 may provide its signed router client certificate 136 to the remote SCS 110. The client security certificate 136 may be structured using the X.509 standard and comprise various information, such as a digital signature, expiration date, the router web server's name, name of the CA, revocation status, SSL/TLS version number, serial number, etc. In some implementations, the client security certificate 136 may be stored in the router's secure storage 122. The router web server 132 may access the client security certificate 136 and provide the client certificate to the remote SCS 110. The client security certificate 136 may be embedded in the router 104 at the time of manufacture. In an example aspect, the client security certificate 136 is issued by the remote SCS 110. In another example aspect, the client security certificate 136 may be issued by a CA trusted by the remote SCS. For example, the client security certificate 136 may be linked to a root CA that the remote SCS 110 may also be configured to inherently trust. That is, the client security certificate 136 may properly chain up to a same root CA for which the remote SCS 110 has a root CA certificate stored. In some implementations, the root may be a unique root for this purpose. According to an example aspect, the client security certificate 136 is used for client authentication.

In one example, the remote SCS 110 comprises a public key of the issuer of the router's client security certificate 136 (e.g., based on a root CA that the remote SCS 110 inherently trusts), wherein the remote SCS can use the issuer's public key to verify the issuer's signature. In another example, the remote SCS 110 may verify the identity of the home router 104 based on other credentials, such as a name of the router web server 132, which may be included in information in the router's client security certificate 136. In another example, the remote SCS 110 may further check other information included in the router's client security certificate 136 to determine the certificate's validity, such as the validity/expiration date(s) of the certificate. In some example aspects, the remote SCS 110 is configured to perform client certificate authentication, wherein only devices (e.g., router 104) that are loaded with particular client certificates (e.g., router client security certificate 136) succeed authentication. For example, another router that does not comprise a router client security certificate 136 may not be authenticated successfully.

In example aspects, as part of the handshake protocol, the router web server 132 may create a random pre-master secret, encrypt it with the public key included in the remote SCS's certificate, and then send the encrypted pre-master secret to the remote SCS 110. The remote SCS 110 may be configured to decrypt the pre-master secret by using's the remote SCS's corresponding private key. The remote SCS 110 and the router web server 132 may be configured to generate a master secret and session keys based on the pre-master secret. The router web server 132 may be further configured to send a notification to the remote SCS 110 to indicate that the router web server will start using the new session keys for hashing and encrypting messages between the router web server 132 and the remote SCS 110. In response, the remote SCS 110 may switch its record layer security state to symmetric encryption using the session keys. The router web server 132 and the remote SCS 110 may then exchange data over the secured channel they have established, wherein messages sent from the router web server 132 to the remote SCS 110 and from the remote SCS to the router web server are encrypted using the new session key.

According to an aspect, the router web server 132 may be configured to generate a CSR and to submit the CSR to the remote SCS 110 via the secure connection. In some implementations, the router web server 132 may include a CSR service that is configured to generate and fill information in the CSR to send to the remote SCS 110. In a first example implementation, as part of generating a CSR, the remote SCS 110 is configured to create a public and private key pair, and to include required and optional fields, key usage details, and optional extensions to the certificate request. According to an aspect, the CSR includes the public key that will be included in the router web UI security certificate 140 (e.g., that the user's computing device 102 can use for establishing a secure connection with the router web server 132 for securely accessing the router web UI 108). A private key may be created at the same time the router web server 132 generates the CSR, making the public and private key pair. Only the public key is forwarded to the remote SCS (e.g., included in the CSR for signing). The private key remains with the router web server 132; accordingly, only the requestor (i.e., router web server 132) has the key to the router web UI security certificate 140. In an example aspect, the CSR is encoded using ASN.1 according to the PKCS #10 specification.

In a second example implementation, as part of requesting a signed router web UI security certificate 140, the router web server 132 may send a request to the remote SCS 110 including required elements (e.g., such as the organization name/unit, common name (domain name), locality, and country), extensions, and optional elements. This request may be a request for the remote SCS 110 to create a key pair and certificate, where the private key may be returned to the router web server 132 in the signed router web UI security certificate 140. The router web server 132 may send this request via an API (JSON/XML), as a web request, etc.

According to an aspect, the remote SCS 110 may be configured to validate the identity of the router web server 132 based on identifying information (e.g., IP address, MAC address, or other unique identifiers) of the home router 104 stored in the ISP billing system 138. The remote SCS 110 may be configured to communicate with the billing system 138 of the user's ISP, which stores information about services and products (e.g., home router 104) subscribed to by the user. In an example aspect, the billing system 138 provides an API (Application Programming Interface), which the remote SCS 110 can call for requesting validation that the identity of the home router 104 is associated with a home router in the ISP billing system 138.

According to an example aspect, the router web server 132 may further provide information about the user's computing device 102a to the remote SCS 110 that can be utilized to generate the router web UI security certificate 140 that is particular to the user's computing device 102a. In an example aspect, computing device 102a information may be included in an extension in the router web UI security certificate 140. For example, the computing device 102a information may include information associated with the computer's operating system (OS), web browser 106 type, MAC address (which may include an Organization Unique Identifier (OUI), IP address, BLUETOOTH® address, cipher type, hash type, etc. In some examples, at least a portion of the computing device 102 information may be provided to the home router 104 by the user's computing device 102 as part of a handshake operation when the user's computing device requests a secure connection to the router web server 132, or the information may be provided in a separate transaction. In other examples, at least a portion of the computing device 102 information may be stored in memory on the home router 104.

The router web server 132 is further configured to submit the CSR to the remote SCS 110 for signing the router web UI security certificate 140. The remote SCS 110, who the web browser 106 is configured to recognize as a trusted CA based on the remote SCS CA certificate 134 stored in the user's computing device's 102a (or web browser's 106) certificate store 107, is configured to validate the requestor and verify information in the CSR, and when validated, sign the router web UI security certificate 140, which includes the router web server's public key (which was included in the CSR). According to an aspect, the remote SCS 110 may be configured to sign the router web UI security certificate 140 with the remote SCS's 110 private key.

According to an example aspect, the router web UI security certificate 140 may be an X.509 certificate. In an example aspect, the router web UI security certificate 140 includes the router web server's 132 public key, an identifier of the router web server, an identifier of the remote SCS 110, a date/time from which the router web UI security certificate 140 is valid, and an expiry date/time of the certificate. The signed router web UI security certificate 140 may also include the certificate chain (the certificate of the signing authority, and any other intermediates in the chain up to the root certificate). According to an aspect, the router web UI certificate 140 may be a short-lived security certificate for increased security. For example, the router web UI security certificate 140 may be set with a short (e.g., one hour, several hours, one day) validity period. In some implementations, the router web UI security certificate 140 may be a single-use certificate.

In an example aspect, after obtaining the signed router web UI certificate 140, the router web server 132 may reply to the web browser 106 with a "Server Hello" message. The "Server Hello" message may either comprise selected options (from among those proposed in the "Client Hello" message), or it may be a handshake failure message. For example, the router web server 132 may select a preferred version of the SSL/TLS protocol from among those presented by the web browser 106 and include the selected preferred version in the "Server Hello" message. The "Server Hello" message may further include the server random, which may be a 32-byte random number. The server random and the client random may be used later to generate the encryption key. In an example aspect, the "Server Hello" message may further include a selected cipher suite selected from among the cipher suites included in the "Client Hello" message.

As part of completing the handshake protocol with the web browser 106, the router web server 132 is further configured to pass the router web UI security certificate 140 to the web browser 106. In response to receiving the router web UI security certificate 140, the web browser 106 may be configured to verify the web UI security certificate 140. For example, as part of verifying the web UI security certificate 140, the web browser 106 may decipher the signature using the SCS's public key included in the remote SCS CA certificate 134 that the web browser 106 or the user's computing device 102a may store in the certificate store 107. Additionally, the web browser 106 may calculate the hash of the router web UI security certificate 140. If the hash of the router web UI security certificate 140 is equal to the hash calculated from deciphering the signature, the web browser 106 can be assured that the router web UI security certificate 140 is really issued by the remote SCS 110 and that the public key in the web UI security certificate 140 belongs to the router web server 132.

In an example aspect, as part of verifying the signature, the web browser 106 may be configured to check the validity of the chain of trust. For example, the web browser 106 may perform certificate path processing, where the browser constructs a certification path from the router web UI security certificate 140 to the remote SCS CA certificate 134, and then checks information in each certificate in the chain. For example, as part of checking the information in each certificate, the web browser 106 may perform one or a combination of verifying basic certificate information, verifying that each certificate has a valid signature, verifying that each certificate is in its validity period, verifying that none of the certificates have been revoked, verifying that the Subject Alternative Name (SAN) extension is consistent, verifying that policy set information are consistent, process critical extensions, and verifying if the certificate is a CA certificate. If the verifications are passed, the router web UI 108 may be determined to be trusted. If not, a security warning may be displayed.

In response to verifying the router web UI security certificate 140, the web browser 106 and the router web server 132 may be further configured to complete the handshake protocol for enabling the web browser to access the router web UI 108. For example, as part of completing the handshake protocol, the web browser 106 may encrypt a premaster secret with the router web server's public key. By successfully decoding the premaster secret (with the router web server's private key) and producing a correct finished message, the router web server 132 demonstrates that it knows the private key corresponding to the public key included in the router web UI security certificate 140. The secure communication tunnel may then be established between the web browser 106 and the router web server 132, and router web UI 108 data can then be sent. For example, the router web server 132 may send one or more files corresponding to the router web UI 108 to the client (e.g., web browser 106) via the secure connection. The web browser 106 may be configured to receive the one or more files corresponding to the router web UI 108 (e.g., sent to the browser as a series of data packets), assemble the data packets into the router web UI 108, and display the router web UI on a display of the user's computing device 102a. The user may be enabled to use the router web UI to configure the home router 104, to change router settings, to configure Wi-Fi security settings, implement or adjust parental controls, view a status of devices connected to the router, etc.

Figure 1B:
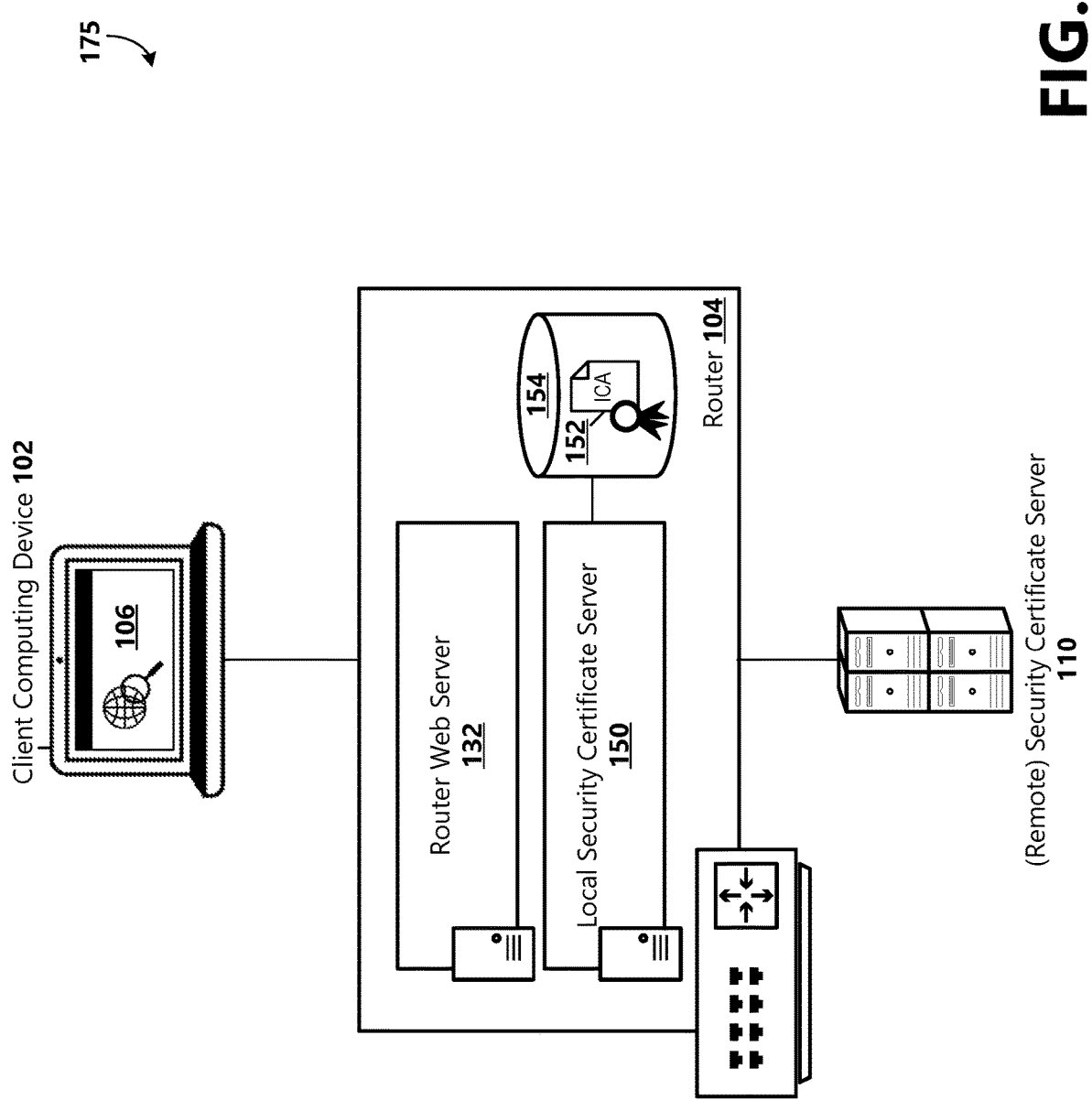
FIG. 1B is a block diagram of another example operating environment in which a system can be implemented for providing secure access to a router web user interface according to an embodiment.

FIG. 1B is a block diagram of another example operating environment in which a local intermediate CA architecture 175 is implemented for providing secure access to a router web UI 108 according to an embodiment. As illustrated in FIG. 1B, in some implementations, an SCS service (i.e., local SCS 150) is implemented locally on the home router 104. For example, the local SCS 150 may be configured to establish a secure connection with the remote SCS 110, and request and obtain a signed intermediate CA certificate 152 from the remote SCS 110 that allows the local SCS to function as an intermediate CA. In functioning as an intermediate CA, the local SCS 150 is operative or configured to sign/issue valid trusted certificates, including router web UI security certificates 140 requested by the router web server 132. That is, when implementing the local intermediate CA architecture 175, the router web server 132 may be configured to direct router web UI security certificate 140 CSRs to the local SCS 150 rather than to the remote SCS 110 as in the first implementation example.

The local SCS 150 is configured to generate a CSR for the intermediate CA certificate 152, and transmit the CSR to the remote SCS 110 (e.g., after a secure connection is established via completing a handshake operation). In generating the CSR, the local SCS 150 may create a public and private key pair, enable an option for a basic constraint CA, add required and optional fields, add key usage details, and add any extensions to the certificate request. For example, the intermediate CA CSR may include the intermediate CA public key created by the local SCS 150.

The remote SCS 110 may be configured to verify information included in the intermediate CA CSR and may verify the requestor (local SCS 150). Upon verification, the remote SCS 110 may sign the intermediate CA certificate 152 with the remote SCS's private key (root CA key) and send the signed certificate to the local SCS 150. The local SCS 150 may store the signed intermediate CA certificate 152 in the router's secure storage 122 or in another key store 154 specific to the local SCS 150. Typically, intermediate CA certificates may be configured with long validity periods. According to aspects of the present disclosure, the intermediate CA certificate 152 requested and obtained by the local SCS 150, is short-lived (e.g., 1-7 day validity period) for increased security. In some examples, the local SCS 150 may request and obtain a signed intermediate CA certificate 152 periodically. For example, the local SCS 150 may create a CSR for the intermediate CA certificate 152 at a predetermined schedule prior to expiration of a previously-obtained intermediate CA certificate. Accordingly, the local SCS 150 may continuously have an intermediate CA certificate 152 that it can use to locally issue/sign router web UI security certificates 140 (e.g., requested by the router web server 132) on demand, even when the router device 104 may be offline (from the remote SCS 110).

According to an aspect, as in the first example operating environment 100, the client is configured to trust the remote SCS 110 as a CA based at least in part on the remote SCS CA certificate 134 stored in the client computing device's trusted root CA store. According to an aspect, the remote SCS CA certificate 134 may be a root CA certificate signed by the remote SCS 110. Accordingly, a trust-chain is generated that begins at the trusted root CA (i.e., the remote SCS 110), through the intermediate CA (i.e., the local SCS service 150), and ends with the router web UI security certificate 140 issued to the router web server 132.

Using a local intermediate CA architecture 175, the local SCS 150 is configured to handle the time and latency-sensitive signing of the router web UI security certificate 140. As can be appreciated, this can allow for batches of routers 104 to schedule intermediate CA CSRs, which allows the load on the remote SCS 110 to be better managed and reduces network bandwidth. For example, rather than handling bursty router web UI security certificate CSRs on-demand (which may require an immediate/real-time turnaround), the remote SCS 110 is enabled to handle the signing of intermediate CA certificates 152 on a scheduled basis, which can be managed such that the intermediate CA CSR is not latency-sensitive (e.g., does not require immediate signing). The local intermediate CA architecture 175 can further reduce end-user latency since the "round-trip" request for certificate signing is handled locally.

FIG. 2A is a sequence diagram showing an example sequence of messages exchanged between the user's client computing device 102, the router web server 132 of the home router 104, and the remote SCS 110 for providing secure access to the router web UI 108 according to an embodiment. In FIG. 2A, various arrows are labeled with circled reference numerals indicative of an example flow of data and/or operations among the computing device 102, the router web server 132, and the remote SCS 110. As should be appreciated, some messages can be exchanged out of order or operations can be performed out of order (e.g., substantially concurrently or in reverse order) as shown in FIG. 2A. With reference now to FIG. 2A, communication 202 is illustrative of an initiation of a handshake operation where the web browser 106 on the client computing device 102 requests a secure connection to the router web server 132 of the home router 104. For example, when the web browser 106 attempts to connect to the web UI 108 of the home router 104, the web browser may require HTTPS for a secure connection, and may initiate a TLS connection. As part of initiating the TLS connection, the web browser 106 may present a list of supported cipher suites (e.g., ciphers and hash functions). The router web server 132 is configured to select a cipher and hash function from the list that it supports and to respond to the client computing device 102 with the selected cipher suite.

The router web server 132 is further configured to open a secure (TLS) connection to the remote SCS 110. For example, communication 204 represents a handshake operation between the router web server 132 and the remote SCS 110. As part of the handshake operation, the router web server 132 and the remote SCS 110 may exchange various information used to determine connection properties.

Upon completing the handshake operation as described above and establishing a secure connection, the router web server 132 may be configured to generate and send a request (e.g., CSR) to the remote SCS 110 for issuing a signed router web UI security certificate 140 that it can use to share its public key with the web browser 106. Communication 206 is illustrative of this CSR transmission. In example aspects, the CSR may include information associated with the user's client computing device 102 (e.g., web browser 106 type, OS type, MAC address, IP address, cipher type, hash type). In an example aspect, the information included in the CSR includes information included in the certificate (e.g., router web UI certificate 140), for example, that may enable the certificate to be usable by the user's computing device 102. In some examples, the router web server 132 may be configured to provide a session cookie or equivalent that can be used to identify specific sessions. In some examples, the remote SCS 110 may be configured to communicate with the billing system 138 of the user's ISP, which stores information about services and products subscribed to by the user, to validate the requestor (e.g., router device 104 or the router web server 132) and/or the CSR. According to an aspect, the router web UI certificate 140 includes the router web server's public key, and is signed by the remote SCS's private key. As described above, in some implementations, the router web UI certificate 140 may have a short expiration date (e.g., an hour, several hours, a day) and/or may be a single use certificate for increased security. Communication 208 represents a transmission of the signed router web UI certificate 140 to the router web server 132.

Communication 210 is illustrative of a completion of the handshake operation between the user's computing device 102 and the router web server 132. For example, after obtaining the signed router web UI certificate 140 from the remote SCS 110 and as part of completing the handshake operation, the router web server 132 may provide the signed router web UI security certificate 140 to the computing device 102. The computing device 102 may verify the router web UI security certificate 140 (e.g., verify the remote SCS's signature, verify the chain of trust, encrypt a premaster secret with the router web server's public key, which if the router web server 132 is able to successfully decode the premaster secret, verifies that the router web server knows the private key corresponding to the public key included in the router web UI security certificate) and complete the handshake operation (as described above with reference to FIG. 1A) for establishing a secure connection with the router web server 132. Via the secure connection, communication 212 is illustrative of a request for the router web UI 108, and communication 214 is illustrative of a response to the request. For example, the response may be sent as a plurality of data packets including one or more files comprising router web UI 108 content, which the computing device 102a is configured to receive and assemble for displaying the router web UI 108 on a display of the user's computing device 102.

Figure 2B:
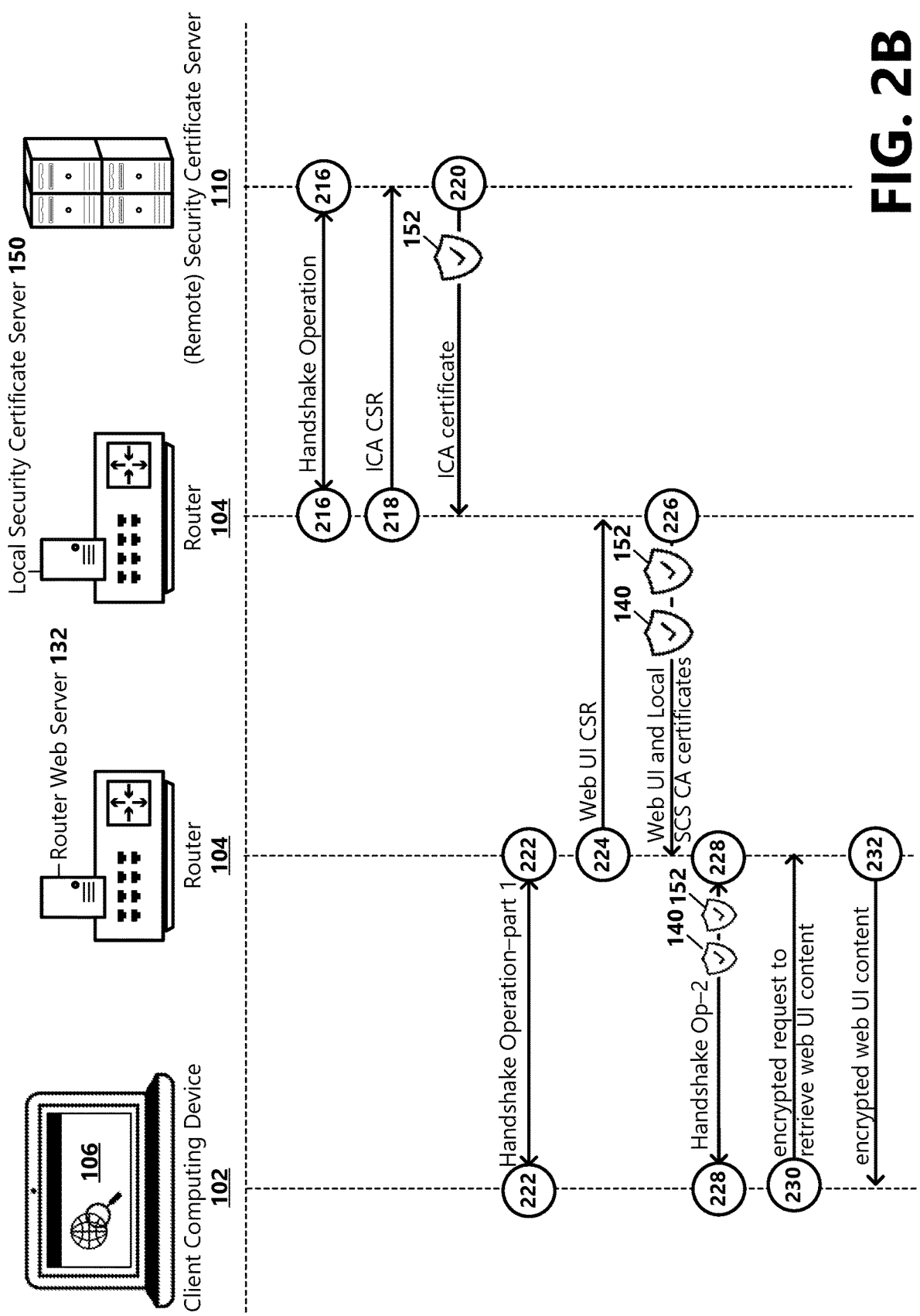
FIG. 2B is a sequence diagram showing an example sequence of messages exchanged between a client computing device, a router web UI server, security certificate server implemented on the router, and a remote security certificate server for providing secure access to a router web user interface according to an embodiment.

FIG. 2B is a sequence diagram showing an example sequence of messages exchanged between the user's client computing device 102, the router web server 132, the local SCS 150, and the remote SCS 110 for providing secure access to the router web UI 108 according to an embodiment. As in FIG. 2A, in FIG. 2B, various arrows are labeled with circled reference numerals indicative of an example flow of data and/or operations among the client computing device 102, the router web server 132, the local SCS 150, and the remote SCS 110. As should be appreciated, some messages can be exchanged out of order or operations can be performed out of order (e.g., substantially concurrently or in reverse order) as shown in FIG. 2B. With reference now to FIG. 2B, communication 216 represents a handshake operation between the local SCS 150 and the remote SCS 110 where the local SCS and the remote SCS may exchange various information used to determine connection properties. According to an aspect, as part of the handshake operation, the local SCS 150 may send credentials, which may include the router's client certificate 136 or other identifying information that the remote SCS can verify (e.g., with the ISP billing system 138), to the remote SCS 110 for enabling the remote SCS to authenticate the home router 104.

Upon completing the handshake operation as described above and establishing a secure connection, the local SCS 150 may generate an intermediate CA CSR. As part of generating the intermediate CA CSR, the local SCS 150 may create a public and private key pair, enable a basic constraint CA option, add required and optional fields, add key usage details, and add any extensions to the CSR. The public key (i.e., local SCS public key/intermediate CA key) is included in the CSR and sent to the remote SCS 110. Communication 218 is illustrative of this CSR transmission.

The remote SCS 110 may verify the requestor (local SCS 150) and the intermediate CA SCR, sign the certificate with the remote SCS's private key (root CA key), and send the signed certificate to the local SCS 150. Communication 220 represents a transmission of the signed intermediate CA certificate 152 to the local SCS 150. As described above, the local SCS 150 may periodically obtain signed intermediate CA certificates 152 (e.g., according to a predetermined schedule) for enabling the local SCS 150 to act as an intermedia CA and issue signed router web UI security certificates 140 for the router web server 132 on demand.

Communication 222 represents an initiation of a handshake operation where the web browser 106 on the client computing device 102 requests a secure connection (e.g., TLS) to the router web server 132 of the home router 104. For example, the web browser 106 may present a list of supported cipher suites (e.g., ciphers and hash functions) from which the router web server 132 can select a cipher and hash function from the list that it supports. For obtaining a signed router web UI security certificate 140 for establishing the secure connection with the client, the router web server 132 may generate a router web UI security CSR (e.g., create a public and private key pair, add required and optional fields, add key usage details, and add any extensions to the certificate request) and send the CSR, including the created public key, to the local SCS 150 (represented as communication 224) for signing. In some examples, the local SCS 150 may be configured to communicate with the billing system 138 of the user's ISP, which stores information about services and products subscribed to by the user, to validate the router 104/router web server 132/CSR. According to an aspect, after confirming validity of the CSR and the requestor, the local SCS 150 may sign the router web UI CSR with the intermediate CA private key. As described above, the router web UI certificate 140 may have a shortened validity period (e.g., an hour, several hours, a day) and/or may be a single use certificate for increased security. The local SCS 150 may then pass the signed router web UI security certificate 140 to the router web server 132, which is represented as communication 226.

Communication 228 is illustrative of a completion of the handshake operation between the client computing device 102 and the router web server 132. For example, after obtaining the signed router web UI certificate 140 from the local SCS 150 and as part of completing the handshake operation, the router web server 132 may provide the signed router web UI security certificate 140 to the web browser 106. The client may verify the router web UI security certificate 140 (e.g., verify the local SCS's signature, verify the chain of trust, encrypt a premaster secret with the router web server's public key, which if the router web server 132 is able to successfully decode the premaster secret, verifies that the router web server knows the private key corresponding to the public key included in the router web UI security certificate) and complete the handshake operation for establishing a secure connection with the router web server 132. When the web browser 106 tries to verify the router web UI security certificate 140, because it is signed by an intermediate CA, the web browser may also verify the intermediate CA certificate 152 against the root CA certificate 134.

Via the secure connection, communication 230 is illustrative of a request for the router web UI 108, and communication 232 is illustrative of a response to the request. For example, the response may be sent as a plurality of data packets including one or more files comprising router web UI 108 content, which the web browser 106 is configured to receive and assemble for displaying the router web UI 108 on a display of the user's computing device 102.

Figure 3A:
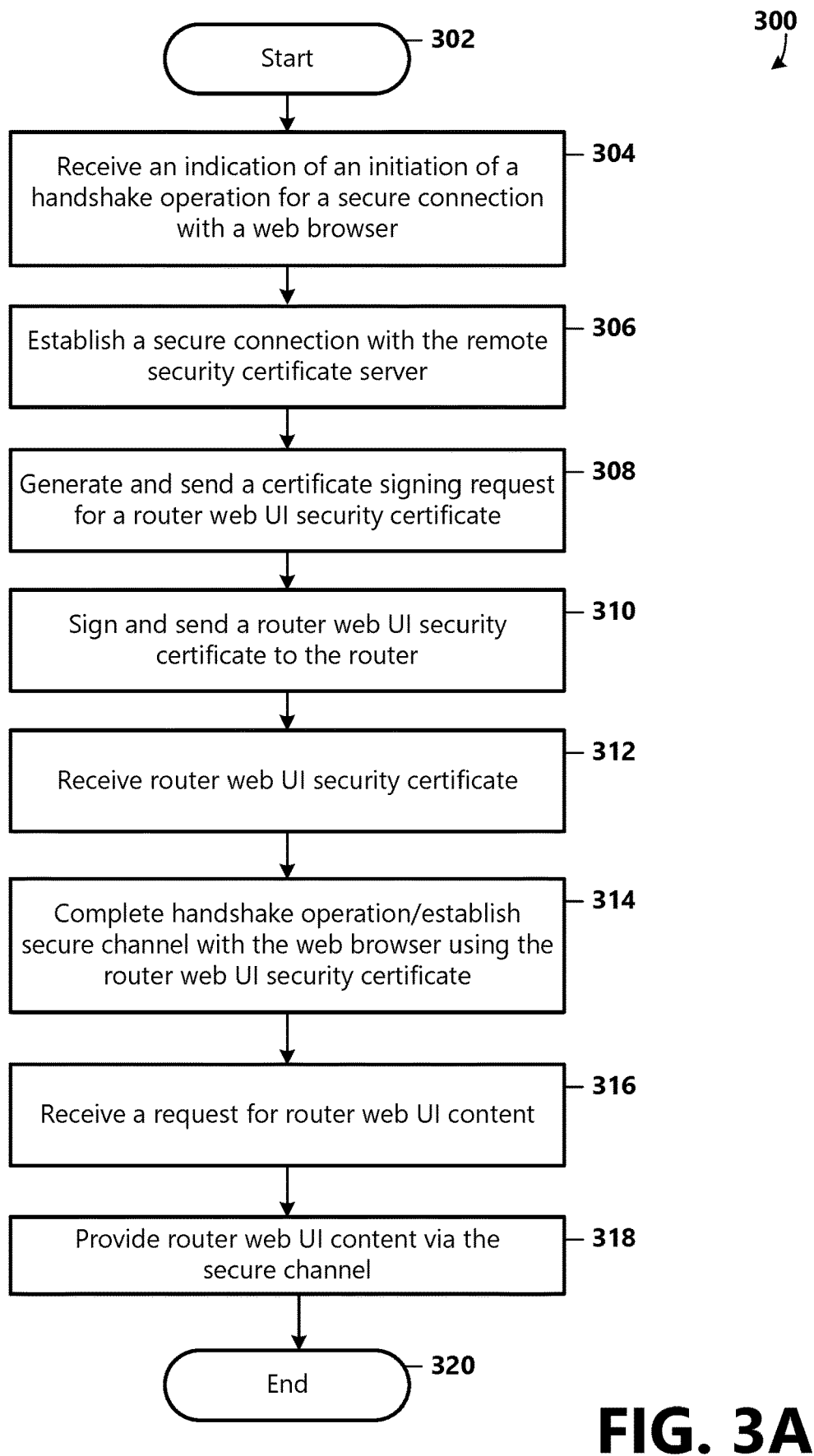
FIG. 3A is a flow diagram depicting general stages of an example process for providing secure access to a router web user interface according to an embodiment.

FIG. 3A is a flow diagram that depicts general stages of an example method 300 for providing secure access to a router web UI 108 according to an embodiment. The method 300 starts at OPERATION 302, and proceeds to OPERATION 304, where the method 300 uses the router web server 132 of a router 104 to receive an indication of an initiation of a handshake operation (e.g., communication 202) from a user's computing device 102a. For example, a user may use a web browser 106 executing on the computing device 102a to access the router's web UI 108, and the web browser may be configured to use a particular protocol (e.g., TLS protocol) that uses security certificates to authenticate communicating parties to each other. According to one example, the user may enter the address of the router web server 132 in the address bar of the web browser 106, which initiates the handshake operation with the router web server.

At OPERATION 304, the method 300 uses the router web server 132 to receive a "Client Hello" message that may include information such as supported client versions, a client random number, a session ID, and/or supported cipher suites. According to an aspect, prior to the router web server 132 responding to the "Client Hello" message with a "Server Hello" message, at OPERATION 306, the method 300 uses the router web server 132 to establish a secure connection with the remote SCS 110 to obtain a signed router web UI security certificate 140 that it can present to the user's computing device 102a for enabling the web browser 106 to confirm the identity of the router web server 132 for establishing a secure connection with the router web server. As part of establishing the secure connection with the remote SCS 110, the router web server 132 and the remote SCS 110 may send "hello" messages. Further, the router web server 132 may provide unique identification information or the router's client security certificate 136 to the remote SCS, wherein the client certificate may be issued by the remote SCS 110 or by a CA trusted by the remote SCS. According to an aspect, when the remote SCS 110 verifies the identity of the router 104 or router web server 132, the remote SCS and the router web server 132 may exchange various handshake protocol messages for exchanging ciphering information that allows the router and the remote SCS to send encrypted messages that each can decipher (i.e., establish a secure connection).

When the secure connection is established, at OPERATION 308, the method 300 uses the router web server 132 to generate and send a CSR (e.g., communication 206) to the remote SCS 110 for requesting the signed router web UI security certificate 140. As part of generating the router web UI security CSR, the router web server 132 may include various information associated with the user's computing device 102a (e.g., OS type, browser type, MAC address, IP address, cipher type, hash type). For example, the information can define the encryption algorithm to be used in the router web UI security certificate 140, optional extensions to be included in the certificate, etc. In some examples, the router web server 132 may request a signed router web UI security certificate 140 prior to the start of a session. For example, the router web server 132 may be configured to load a new router web UI security certificate 140 periodically according to a predetermined schedule, which may be utilized for off-network operation.

At OPERATION 310, the method 300 uses the remote SCS 110 to verify the validity of the requester and the CSR. For example, at OPERATION 310, the method 300 uses the remote SCS 110 to communicate with the user's ISP billing system 138 to confirm the identity of the router 104/router web server 132. If the requestor and CSR are validated, the remote SCS 110 may sign the request using the remote SCS's private key (corresponding to the remote SCS's public key included in the remote SCS CA certificate 134 stored by the client computing device 102a). At OPERATION 310, the method 300 further uses the remote SCS 110 to send the signed certificate (i.e., signed router web UI security certificate 140) to the router web server 132. At OPERATION 312, the router web server 132 may receive the signed router web UI security certificate 140 from the remote SCS 110 and store the certificate.

At OPERATION 314, as part of completing the handshake operation, the method 300 further uses the router web server 132 to complete the handshake operation with the web browser 106 on the user's client computing device 102a. At OPERATION 314, the router web server 132 may respond to the computing device's "Client Hello" message with a "Server Hello" message, where the router web server selects a preferred version of the secure communication protocol and a cipher suite included as supported protocol versions and cipher suites in the "Client Hello" message. According to an aspect, the method 300 uses the router web server 132 to send the signed router web UI security certificate 140 to the web browser operating on the computing device 102a, which may confirm the validity of the router web UI security certificate 140. For example, the web browser 106 may decipher the remote SCS's signature using the SCS's public key included in the SCS CA certificate 134 that is stored on the user's computing device 102a, and may calculate the hash of the router web UI security certificate 140. If the hash of the router web UI security certificate 140 is equal to the hash calculated from deciphering the signature, the computing device 102a can be assured that the router web UI security certificate 140 is really issued by the remote SCS 110 and that the public key in the web UI security certificate 140 belongs to the router web server 132.

When the validity of the router web UI security certificate 140 is verified at OPERATION 314, the handshake operation may further use the web browser 106 to create a pre-master key (based on the selected cipher suite), encipher the key with the router web server's public key (included in the router web UI security certificate 140), and send the encrypted key to the router web server 132. Additionally, the router web server 132 may receive the pre-master secret key, and use its private key to decipher it. The web browser 106 and the router web server 132 may then compute a master secret key, which can be used by the web browser and the router web server to symmetrically encipher data for the rest of the communication.

At OPERATION 316, the method 300 uses the web browser to send the router web server 132 an enciphered request for the router web UI 108 via the secure channel. At OPERATION 318, the method 300 further uses the router web server 132 to receive the request, and to retrieve the router web UI 108, and to respond to the request with the requested content (e.g., router web UI files), which the web browser 106 may display to the user on a display of the client computing device 102a. The method 300 ends at OPERATION 320.

Figure 3B:
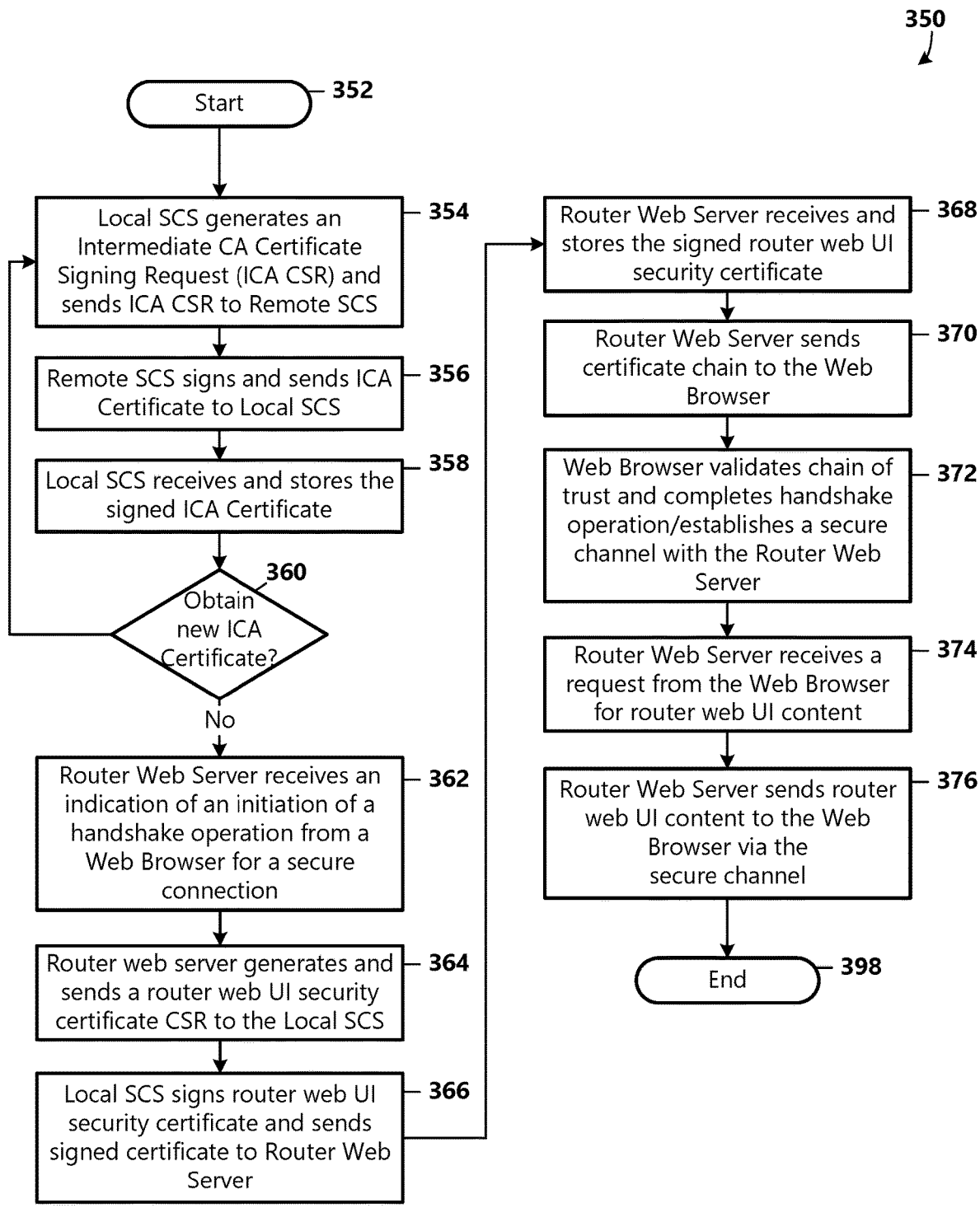
FIG. 3B is a flow diagram depicting general stages of an example process for providing secure access to a router web user interface using a local security certificate server according to an embodiment.

FIG. 3B is a flow diagram that depicts general stages of an example method 350 for providing secure access to a router web UI 108 according to another embodiment. The method 350 starts at OPERATION 352, and proceeds to OPERATION 354, where the local SCS 150 generates and sends an intermediate CA CSR to the remote SCS 110. As part of generating the intermediate CA CSR, the local SCS 150 may create a public and private key pair (i.e., intermediate CA public and private keys/local SCS public and private keys), wherein the public key is included in the intermediate CA CSR. A shortened validation period (e.g., 1-7 days) may be defined in the intermediate CA CSR for increased security.

At OPERATION 356, the remote SCS 110 may verify the local SCS 150 (i.e., the requestor) and details of the intermediate CA CSR and, if valid, signs the intermediate CA certificate with the remote SCS's private key (i.e., root CA key). The remote SCS 110 may then send the signed intermediate CA certificate 152 to the local SCS 150.

At OPERATION 358, the local SCS 150 may receive the signed intermediate CA certificate 152 and store the certificate in the router's secure storage 122 or in another key store 154 specific to the local SCS 150. According to an aspect, the intermediate CA certificate 152 signed by the remote SCS 110 enables the local SCS 150 to sign certificates on behalf of the remote SCS.

At DECISION OPERATION 360, a determination is made by the local SCS 150 as to whether to obtain a new intermediate CA certificate 152. According to an aspect, the determination may be made based on a predetermined schedule. For example, based on the predetermined schedule, the local SCS 150 may create a CSR for the intermediate CA certificate 152 prior to expiration of a previously-issued intermediate CA certificate such that the local SCS 150 may continuously have an intermediate CA certificate 152 that it can use to locally issue/sign router web UI security certificates 140 on demand, even when the router device 104 may be offline (from the remote SCS 110). According to another aspect, the determination may be based on whether a previously-obtained intermediate CA certificate 152 has expired or has been revoked.

If a determination is made to obtain a new intermediate CA certificate 152, the method 350 may return to OPERATION 354. At OPERATION 362, the router web server 132 may receive an indication of an initiation of a handshake operation from a web browser 106. For example, the web browser 106 may send a "client hello" message including the TLS version, cipher suites supported by the client, a random byte string that may be used in subsequent computations, etc. The router web server 132 may respond with a "server hello" message including a selected highest supported TLS version and a cipher and hash function selected from the list of supported suites provided by the web browser 106.

At OPERATION 364, the router web server 132 may generate a CSR for a router web UI security certificate 140 that it can present to the web browser 106 in response to the "client hello" message. As part of generating the router web UI security CSR, the router web server 132 may create a public and private key pair (i.e., public and private router web server keys) and include the public key, required and optional fields, key usage details, and optional extensions to the certificate request. In some examples, the information included in the CSR may be specific to the requesting client (web browser 106). The router web server 132 may then send the router web UI security CSR to the local SCS 150.

At OPERATION 366, the local SCS 150 may validate the requestor (i.e., the router web server 132) and information included in the CSR. In some examples, the local SCS 150 may validate the information included in the CSR against information about the router 104 stored in the ISP billing system 138. If the router web server 132 is validated, the local SCS 150 may sign the router web UI security certificate 140 with the local SCS's intermediate CA private key and send the signed certificate to the router web server.

At OPERATION 368, the router web server 132 may receive and store the signed router web UI security certificate 140 in the router's secure storage 122. At OPERATION 370, the router web server 132 may send the web browser 106 a certificate message including a certificate chain or sequence of certificates that includes the signed router web UI security certificate 140 and the intermediate CA certificate 152.

At OPERATION 372, the web browser 106 may authenticate the router web server 132 using the router web UI security certificate 140. For example, the web browser 106 may iterate through the certificates in the chain of certificates from the remote SCS CA certificate 134 to the router web UI security certificate 140 and validate each certificate's basic information (e.g., signature of the issuer, validity period, and revocation status) and critical extensions. If the procedure concludes with the last certificate in the path without errors, then the path may be accepted as valid. If errors are produced, the path may be marked as invalid. If the path is accepted as valid, the web browser 106 and the router web server 132 may complete the handshake operation and establish a secure communication channel.

At OPERATION 374, the web browser may send the router web server 132 an enciphered request for the router web UI 108 via the secure channel. At OPERATION 376, the router web server 132 may receive the request, retrieve the router web UI 108, and to respond to the request with the requested content (e.g., router web UI files), which the web browser 106 may display to the user on a display of the client computing device 102a. The method 350 ends at OPERATION 398.

Figure 4A:
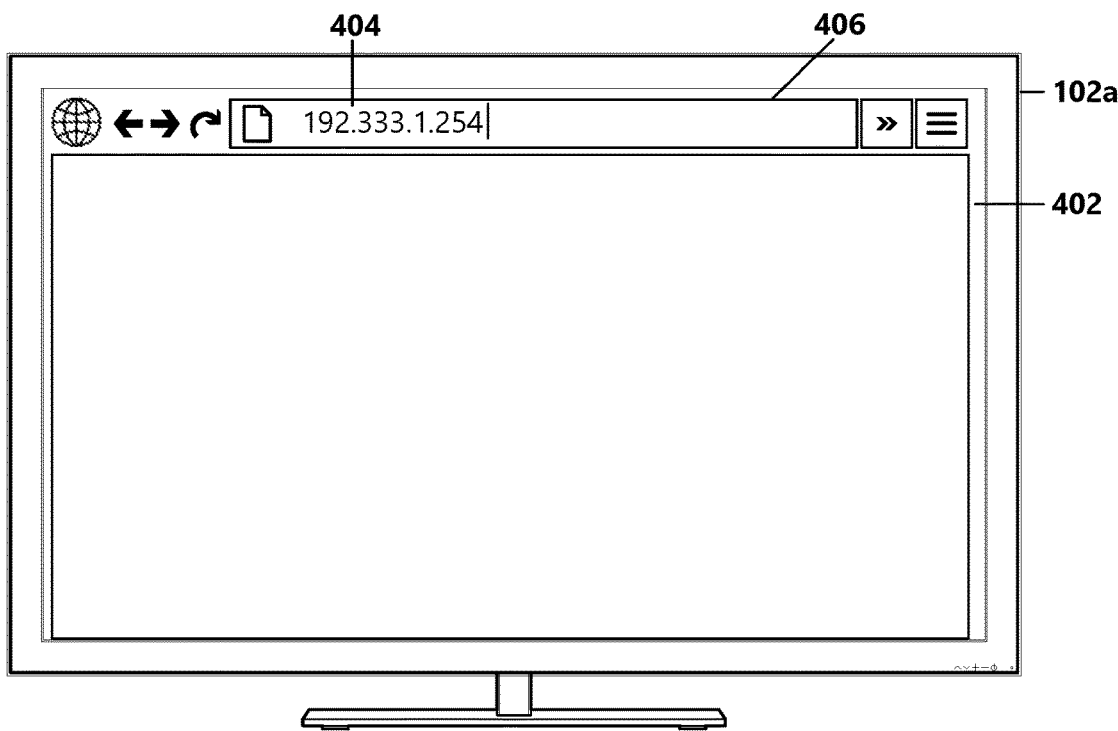
FIG. 4A is an illustration of an example web browser user interface that can be used to enter an IP address of a router for accessing the router web user interface according to an embodiment.

With reference now to FIG. 4A, an example web browser UI 402 is illustrated. The user may use the web browser UI 402 to access the router web UI 108. In an example aspect, the user may enter an IP address 404 of the user's home router 104 in the web browser's address bar 406. For example, responsive to the user entering the IP address 404 (and selecting enter), the web browser 106 may initiate the handshake operation with the router 104 (e.g., OPERATION 302 of FIG. 3A or OPERATION 362 of FIG. 3B).

Figure 4B:
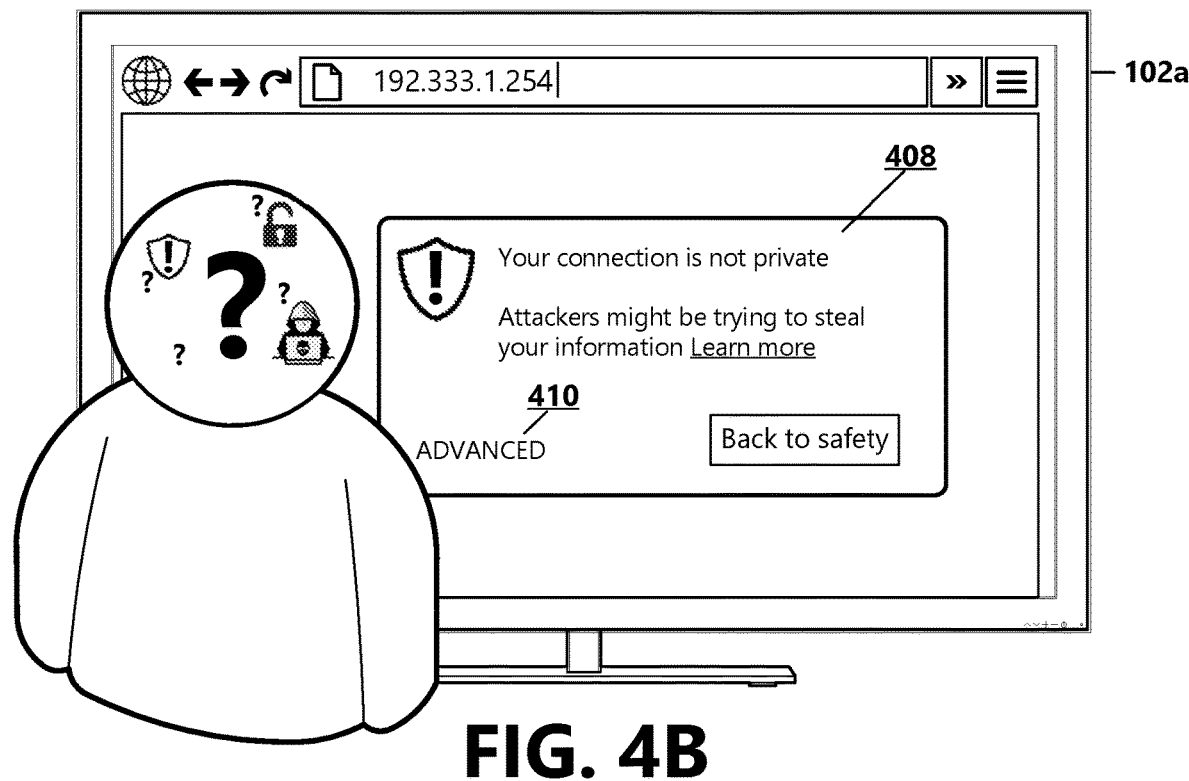
FIG. 4B is an illustration of an example security warning message displayed in a user interface when a client computing device attempts to connect to a web user interface of a home router without a trusted router web user interface security certificate.

With reference now to FIG. 4B, an example warning message 408 that may be displayed when aspects of the present disclosure are not implemented is illustrated. For example, as described in the Background section, current home routers 104 may be configured with a default certificate, which may be self-signed (i.e., not signed by a recognized CA), and thus not trusted by most web browsers 106. Accordingly, without an implementation of aspects of the present disclosure, when the user attempts to access the router web UI 108, the web browser 106 may block access or not allow immediate access to it. As illustrated in FIG. 4B, the web browser 106 may display a warning message 408 that the web connection is not secure or private. To access the router web UI 108, the user may have to click on one or more buttons 410 to allow an exception to access to the web page, change security settings of the web browser 106, etc. As described above, this can be confusing and/or require the expenditure of additional memory and processing resources.

Figure 4C:
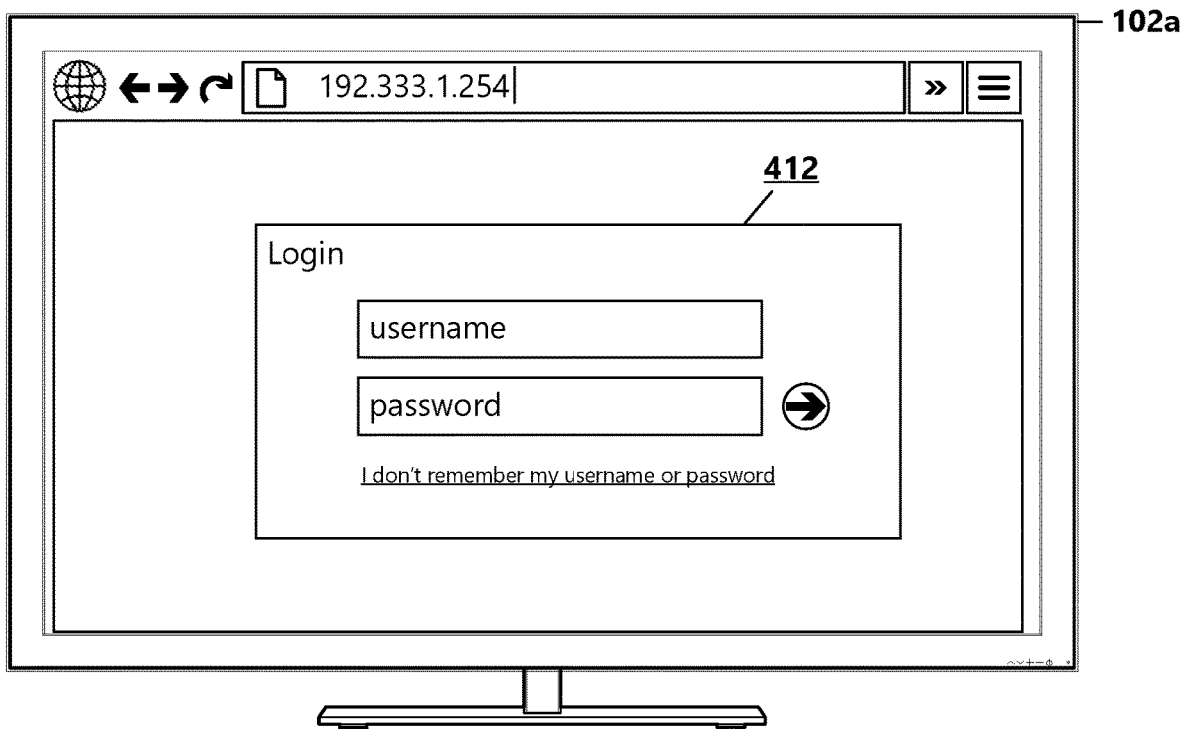
FIG. 4C is an illustration of an example login screen that may be displayed prior to allowing the user to access the router web user interface according to an embodiment.

When aspects of the present disclosure are implemented, the web browser 106 trusts the router web UI security certificate 140 because it is signed by the remote SCS 110, which is a CA that the web browser is configured to trust or by the local SCS 150, which is an intermediate CA linked to the root CA (remote SCS). The web browser 106 may establish a secure connection with the router 104 based on the trust relationship. Accordingly, when the user attempts to access the router web UI 108, rather than being notified of a security risk (e.g., as illustrated in FIG. 4B), the web browser 106 may request and receive the router web UI 108 for display to the user. In some examples and as illustrated in FIG. 4C, the user may be prompted with a login screen 412 before being allowed access to all or a portion of the router web UI 108.

Figure 4D:
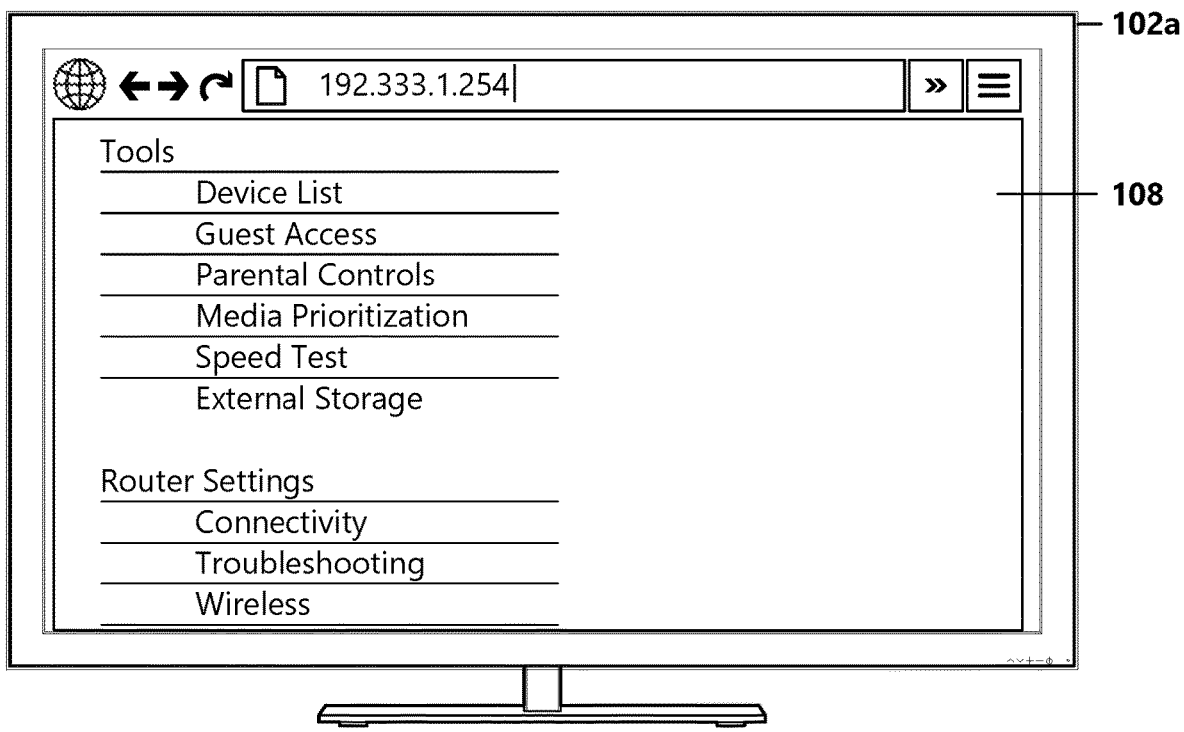
FIG. 4D is an illustration of an example web user interface of a router displayed on a computing device display, wherein the router is configured to obtain an on-demand security certificate that is trusted by the computing device for establishing a secure connection between the router and the computing device.

FIG. 4D is an illustration of an example router web UI 108 that can be generated and provided by the router web server 132 of the home router 104. For example, via the router web UI 108, the user may view connected devices 102, modify a variety of wireless network settings, such as the router's wireless channels, extend the (wireless) customer premises network 105, configure quality of service (QoS) features, change dynamic DNS settings, access parental controls, website blocking, or access scheduling features, etc.

Figure 5:
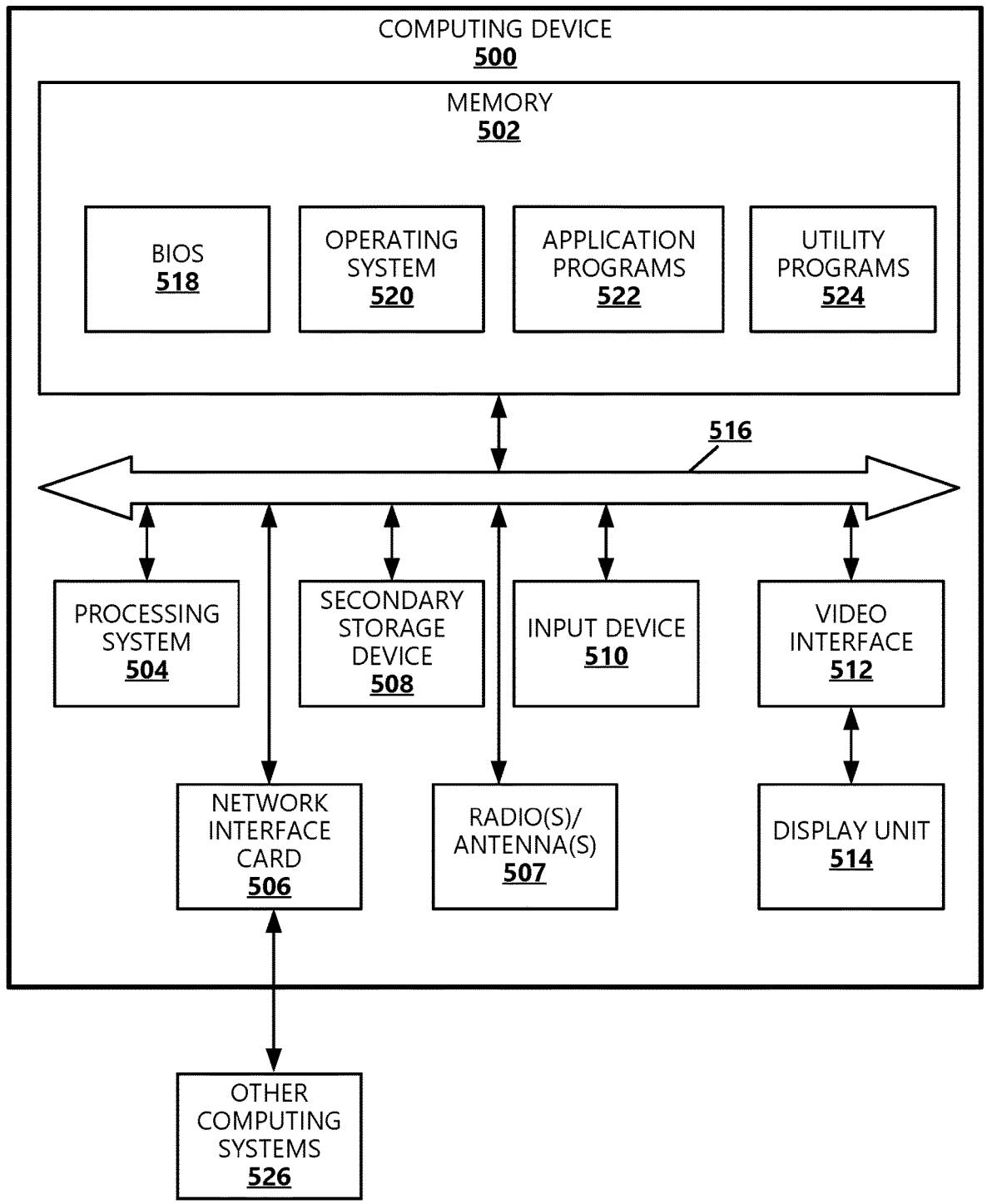
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide the router web UI service 118, the web browser 106, or SCS services according to an embodiment. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
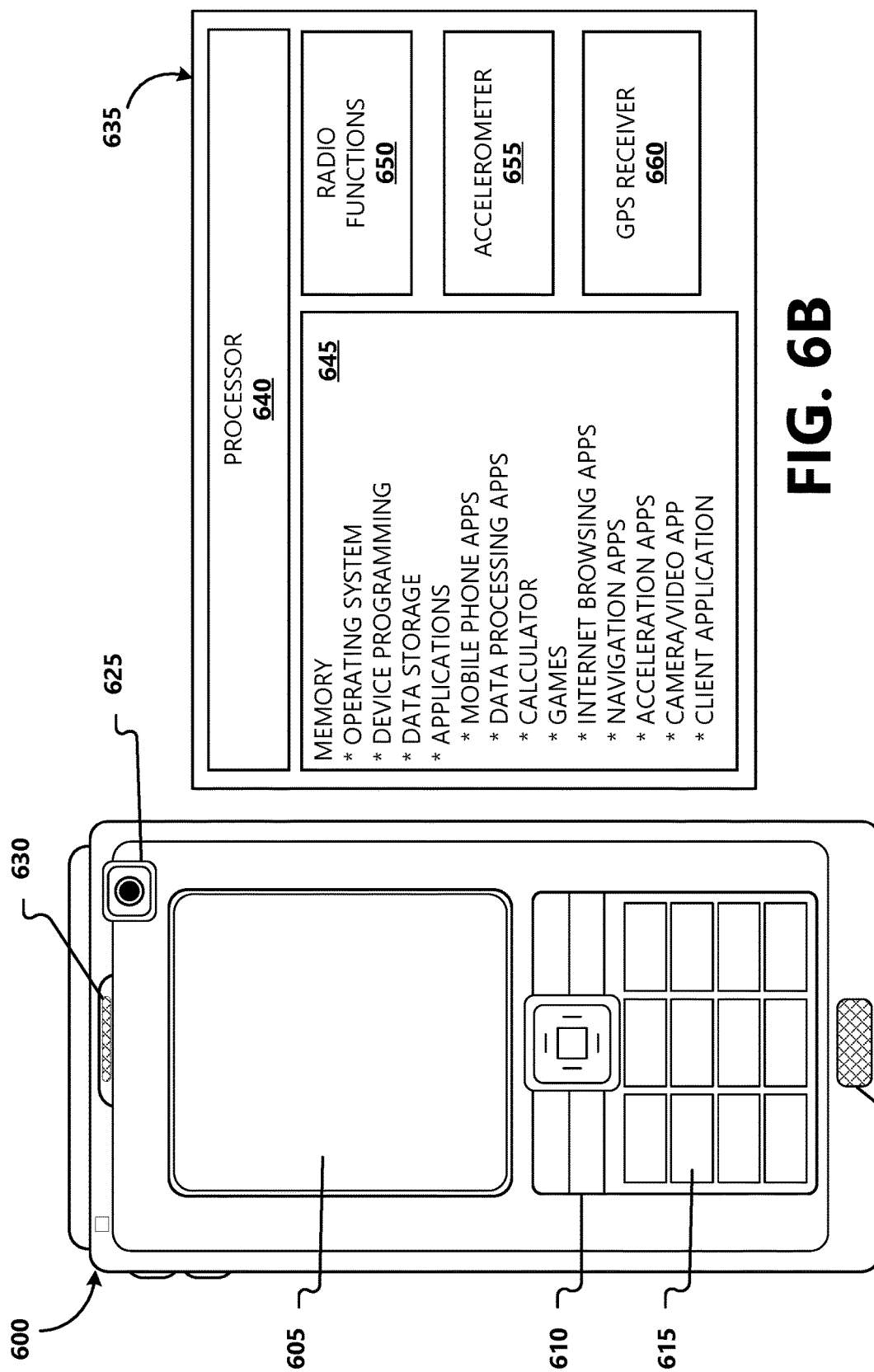
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other computing device 102, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 670 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
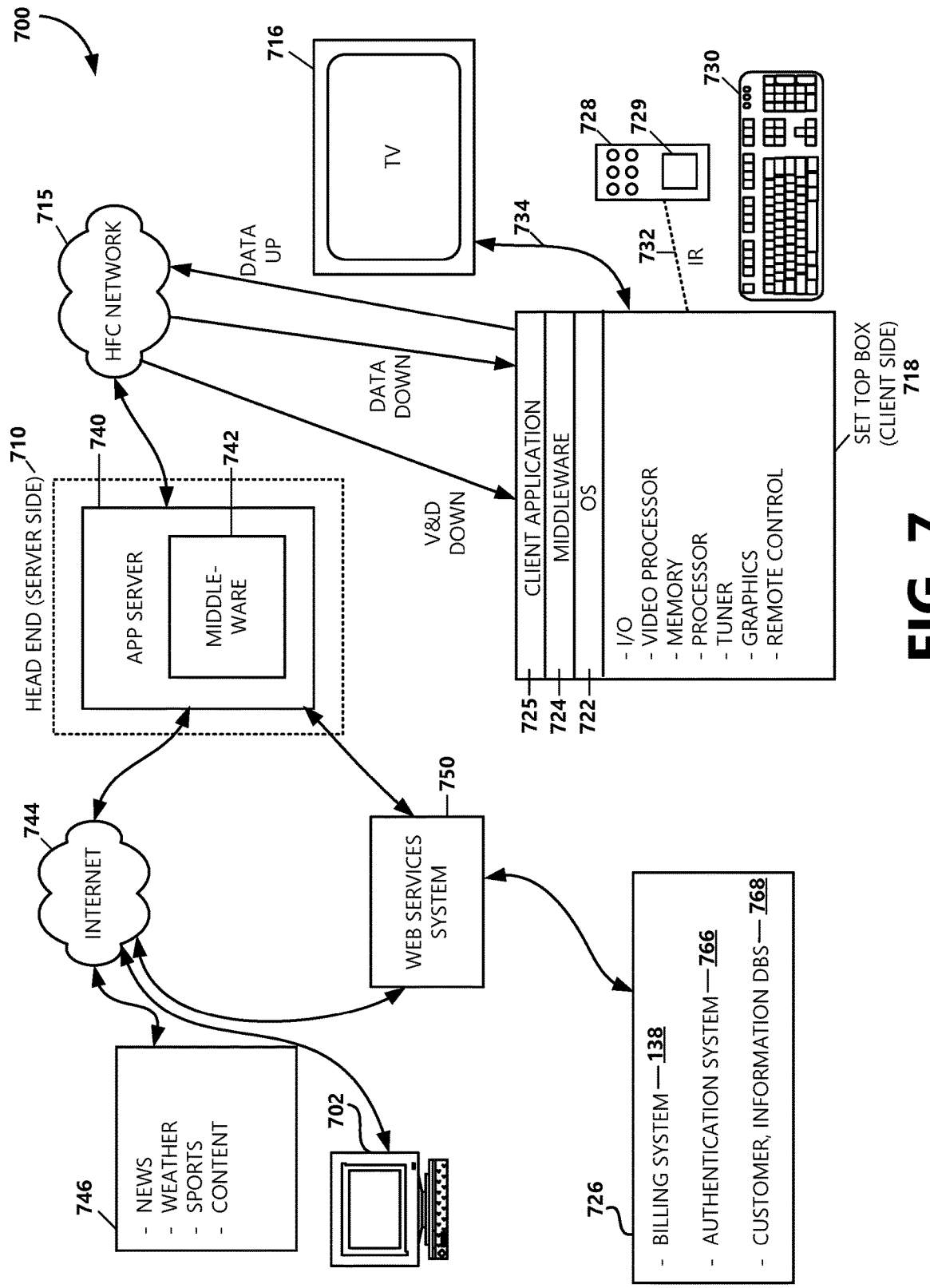
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. Referring now to FIG. 7, digital and analog video programming, information content, and interactive television services are provided via a hybrid fiber coax (HFC) network 715 to a television set 716 for consumption by a cable television/services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 and other computing devices 702 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 138 can include information such as a customer's name, street address, business identification number, Social Security number, credit history, and information regarding services and products subscribed to by the customer. According to embodiments, the billing system 138 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 138, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A router device configured to provide secure access to a router web user interface, the router device comprising:
   at least one processor;
   a memory storage device including instructions that when executed by the at least one processor control the secure access to the router web user interface by a web browser of a client computing device without the web browser presenting a security warning notification, the instructions when executed to:
   receive a request from the web browser of the client computing device for a secure connection;
   receive a list of cipher suites supported by the web browser in order of preference from the client computing device;
   select a cipher and a hash function from the list;
   notify the client computing device of the cipher and the hash function;
   establish a transport layer security (TLS) connection with a remote security certificate server;
   generate a first certificate signing request for obtaining an intermediate certification authority certificate from the remote security certificate server;
   send the first certificate signing request to the remote security certificate server;
   receive a signed intermediate certification authority certificate from the remote security certificate server after the first certificate signing request is validated by the remote security certificate server;
   generate a second certificate signing request for obtaining a signed router web user interface security certificate locally at the router device;
   store the signed router web user interface security certificate locally at the router device after the second certificate signing request is validated locally at the router device;
   transmit a certificate chain to the web browser, the certificate chain comprising the signed router web user interface security certificate validated locally at the router device and the signed intermediate certification authority certificate validated by the remote security certificate server;
   when the certificate chain is validated by the web browser, establish the secure connection with the web browser;
   receive a request from the web browser for the router web user interface via the secure connection; and
   responsive to the request, provide the router web user interface to the web browser via the secure connection.

2. The router device of claim 1, wherein
   the signed router web user interface security certificate includes a certificate with a unique root.

3. The router device of claim 2, further comprising
   a root certification authority certificate for the remote security certificate server installed on the client computing device.

4. The router device of claim 1, further configured to provide a public and a private key pair to the remote security certificate server as part of the first certificate signing request.

5. The router device of claim 4, further configured to generate the first certificate signing request according to a predefined schedule.

6. The router device of claim 1, further configured to provide the router web user interface to the web browser when the router device is off-line or on-line.

7. The router device of claim 1, wherein the signed router web user interface security certificate is at least one of:
   a single use certificate; and
   a short-lived certificate.

8. The router device of claim 1, further configured to provide unique identifying information associated with the router device to the remote security certificate server for verifying the router device.

9. The router device of claim 1, wherein the first certificate signing request includes information associated with the web browser for configuring the signed router web user interface security certificate to be specific to a type of the web browser.

10. A method for providing secure access to a router web user interface without a web browser of a client computing device presenting a security warning notification, the method comprising:
    receiving a request from the web browser for a secure connection;
    receiving a list of cipher suites supported by the web browser in order of preference from the client computing device;
    selecting a cipher and a hash function from the list;
    notifying the client computing device of the cipher and the hash function;
    establishing a transport layer security (TLS) connection with a remote security certificate server;

generating a first certificate signing request for obtaining an intermediate certification authority certificate from the remote security certificate server;

sending the first certificate signing request to the remote security certificate server;

receiving a signed intermediate certification authority certificate from the remote security certificate server after the first certificate signing request is validated by the remote security certificate server;

generating a second certificate signing request for obtaining a signed router web user interface security certificate locally at the router device;

storing the signed router web user interface security certificate locally at the router device after the second certificate signing request is validated locally at the router device;

transmitting a certificate chain to the web browser, the certificate chain comprising the signed router web user interface security certificate validated locally at the router device and the signed intermediate certification authority certificate validated by the remote security certificate server;

when the certificate chain is validated by the web browser, establishing the secure connection with the web browser;

receiving a request from the web browser for the router web user interface via the secure connection; and responsive to the request, providing the router web user interface to the web browser via the secure connection.

11. The method of claim 10, further comprising generating each certificate signing request locally at the router device.

12. The method of claim 10, further comprising verifying the certificate chain to a root certification authority certificate for the remote security certificate server.

13. The method of claim 10, further comprising:
providing to the remote security certificate server at least one of:
unique identifying information associated with the router device for verifying the identity of the router device; and
a client security certificate issued by the remote security certificate server or a certification authority trusted by the remote security certificate server.

14. The method of claim 10, further comprising obtaining the signed intermediate certification authority certificate according to a predefined schedule.

15. The method of claim 10, wherein the first certificate signing request includes information associated with the web browser for configuring the signed router web user interface security certificate to be specific to a type of the web browser.

16. The method of claim 15, wherein the information associated with the web browser comprises at least one of:
the web browser type;
an operating system type;
a MAC address;
an IP address; and
a supported cipher suite.

17. A system comprising:
a remote security certificate server;
a computing device including a web browser; and
a router device configured to control secure access to a router web user interface by the web browser without the web browser presenting a security warning notification, the router device to:
receive a request from the web browser of the computing device for a secure connection;
receive a list of cipher suites supported by the web browser in order of preference from the computing device;
select a cipher and a hash function from the list;
notify the computing device of the cipher and the hash function;
establish a transport layer security (TLS) connection with the remote security certificate server;
generate a first certificate signing request for obtaining an intermediate certification authority certificate from the remote security certificate server;
send the first certificate signing request to the remote security certificate server;
receive a signed intermediate certification authority certificate from the remote security certificate server after the first certificate signing request is validated by the remote security certificate server;
generate a second certificate signing request for obtaining a signed router web user interface security certificate locally at the router device;
store the signed router web user interface security certificate locally at the router device after the second certificate signing request is validated locally at the router device;
transmit a certificate chain to the web browser, the certificate chain comprising the signed router web user interface security certificate validated locally at the router device and the signed intermediate certification authority certificate validated by the remote security certificate server;
when the certificate chain is validated by the web browser, establish the secure connection with the web browser;
receive a request from the web browser for the router web user interface via the secure connection; and
responsive to the request, provide the router web user interface to the web browser via the secure connection.

18. The system of claim 17, further configured to generate a trust-chain using the remote security certificate server and a local certificate signing service of the router device.

19. The system of claim 18, further configured to issue the trust-chain to a router web server included with the router device.

20. The system of claim 17, wherein the remote security certificate server generates a remote security certificate comprising a public key of the remote security certificate server.

* * * * *